(12) United States Patent
Craik et al.

(10) Patent No.: US 9,875,519 B2
(45) Date of Patent: Jan. 23, 2018

(54) OVERLAP AWARE REORDERING OF RENDERING OPERATIONS FOR EFFICIENCY

(71) Applicant: Google Inc., Mountain View, CA (US)

(72) Inventors: Christopher Craik, Berkeley, CA (US); Romain Guy, Millbrae, CA (US)

(73) Assignee: Google LLC, Mountain View, CA (US)

( * ) Notice: Subject to any disclaimer, the term of this patent is extended or adjusted under 35 U.S.C. 154(b) by 32 days.

(21) Appl. No.: 15/019,755

(22) Filed: Feb. 9, 2016

(65) Prior Publication Data

US 2016/0171642 A1 Jun. 16, 2016

Related U.S. Application Data

(63) Continuation of application No. 14/060,378, filed on Oct. 22, 2013, now Pat. No. 9,292,903.

(Continued)

(51) Int. Cl.
| | | |
|---|---|---|
| *G06T 15/50* | (2011.01) | |
| *G06T 1/20* | (2006.01) | |
| *G06T 1/60* | (2006.01) | |

(52) U.S. Cl.
CPC . *G06T 1/20* (2013.01); *G06T 1/60* (2013.01)

(58) Field of Classification Search
CPC ......... G06T 1/20; G06T 15/80; G06T 15/503; G06F 9/38; G06F 9/44; G06F 9/30181;
(Continued)

(56) References Cited

U.S. PATENT DOCUMENTS 5,757,371 A 5/1998 Oran et al.
6,119,220 A 9/2000 Sato
(Continued)

FOREIGN PATENT DOCUMENTS

WO WO 2011/134942 A1 11/2011

OTHER PUBLICATIONS

NVIDIA Corporation,"Whitepaper NVIDIA GF100 World's Fastest GPU Delivering Great Gaming Performance with True Geometric Realism",v1.5, Aug. 5, 2010, available via the Internet af www.nvidia.com/object/IO_86775.html (last visited Oct. 25, 2013).
(Continued)

*Primary Examiner* — Hau Nguyen
(74) *Attorney, Agent, or Firm* — McDonnell Boehnen Hulbert & Berghoff LLP

(57) ABSTRACT

Disclosed are apparatus and methods for rendering using a graphics processing component (GPC). A computing device can receive instructions for a GPC, including an instruction IA associated with a first portion of a canvas. An insertion position in an instruction buffer for instruction IA can be determined by: determining an instruction IB in the instruction buffer that is associated with a second portion of the canvas. If the first and second portions overlap, the insertion position can be based on an overlapping-instruction position of IB in the instruction buffer. Otherwise, if instructions IA and IB are similar, then the insertion position can be based on a second position of IB in the instruction buffer. Otherwise, the insertion position can be determined based on an ending position of the instruction buffer. Instruction IA can be inserted in the instruction buffer at the insertion position.

21 Claims, 10 Drawing Sheets

Related U.S. Application Data

(60) Provisional application No. 61/886,643, filed on Oct. 3, 2013.

(58) Field of Classification Search
CPC .............. G06F 9/3836; G09G 2340/10; G09G 2340/12; G09G 5/377
See application file for complete search history.

(56) References Cited

U.S. PATENT DOCUMENTS

| | | | |
|---|---|---|---|
| 6,161,154 | A | 12/2000 | Schultz et al. |
| 7,392,255 | B1 | 6/2008 | Sholtis et al. |
| 8,212,825 | B1* | 7/2012 | Everitt .................. G06T 15/005 345/505 |
| 8,319,784 | B2* | 11/2012 | Srinivasan ................ G06T 1/20 345/543 |
| 8,854,385 | B1 | 10/2014 | Craik et al. |
| 2004/0015740 | A1 | 1/2004 | Dautelle |
| 2004/0267908 | A1 | 12/2004 | Doi et al. |
| 2005/0035883 | A1 | 2/2005 | Kameda et al. |
| 2005/0271302 | A1 | 12/2005 | Khamene et al. |
| 2006/0195309 | A1 | 8/2006 | Stokkan et al. |
| 2006/0244585 | A1 | 11/2006 | Bishop et al. |
| 2007/0040788 | A1 | 2/2007 | Saha |
| 2007/0091102 | A1 | 4/2007 | Brothers et al. |
| 2007/0165028 | A1 | 7/2007 | Hsu |
| 2007/0174544 | A1 | 7/2007 | Yasuda et al. |
| 2007/0211065 | A1 | 9/2007 | Feth et al. |
| 2007/0245264 | A1 | 10/2007 | Hoerentrup et al. |
| 2008/0126641 | A1 | 5/2008 | Irish et al. |
| 2009/0086265 | A1 | 4/2009 | Toda et al. |
| 2009/0113121 | A1 | 4/2009 | Lee et al. |
| 2010/0079783 | A1* | 4/2010 | Naganuma .............. G06T 11/60 358/1.13 |
| 2011/0134485 | A1 | 6/2011 | Ito |
| 2011/0218777 | A1 | 9/2011 | Chen et al. |
| 2011/0304634 | A1 | 12/2011 | Urbach |
| 2012/0011335 | A1 | 1/2012 | Asnaashari et al. |
| 2012/0280998 | A1 | 11/2012 | Nordlund |
| 2013/0002686 | A1 | 1/2013 | Kota et al. |
| 2013/0262824 | A1 | 10/2013 | Arakawa et al. |
| 2013/0262839 | A1 | 10/2013 | Gschwind et al. |
| 2014/0092091 | A1* | 4/2014 | Li ........................... G06T 15/60 345/423 |
| 2014/0118369 | A1 | 5/2014 | Hakura et al. |
| 2015/0097850 | A1 | 4/2015 | Craik et al. |

OTHER PUBLICATIONS opengl.org, "Rendering Pipeline Overview", Nov. 2, 2012, available via the Internet at www.opengl.org/wiki_132/index.php?title=Rendering_Pipeline_Overview&oldid=8134 (last visited Oct. 24, 2013).

* cited by examiner

OVERLAP AWARE REORDERING OF RENDERING OPERATIONS FOR EFFICIENCY

CROSS-REFERENCE TO RELATED APPLICATIONS

This application is a continuation of U.S. patent application Ser. No. 14/060,378, filed Oct. 22, 2013, entitled "Overlap Aware Reordering of Rendering Operations for Efficiency", which claims priority to U.S. Patent Application No. 61/886,643, filed Oct. 3, 2013, entitled "Overlap Aware Reordering of Rendering Operations for Efficiency", the contents of all of which are fully incorporated by reference herein for all purposes.

BACKGROUND

Unless otherwise indicated herein, the materials described in this section are not prior art to the claims in this application and are not admitted to be prior art by inclusion in this section.

Many modern computing devices, including mobile phones, personal computers, and tablets, provide graphical user interfaces (GUIs) for permitting users to interact with the computing device. For example, application programs can use the GUI to communicate with a user using images, text, and graphical elements such as windows, dialogs, pop-ups, images, buttons, scrollbars, and icons. The GUI can also receive inputs from user-interface devices such as touch screens, computer mice, keyboards, and other user-interface devices to permit the user to control the GUI, and thus the application program.

In some cases, the GUI can be used to interact with an operating system (OS) to manage the computing device. For example, the OS can have a control panel or setting application that uses the GUI to draw one or more windows related to control settings for some aspect(s) of the computing device, such as audio controls, video outputs, computer memory, and human language(s) used by the OS (e.g., choose to receive information in English, French, Mandarin, Hindi, Russian, etc.). The control panel/settings application can receive subsequent input related to the window(s) using the GUI. The GUI can provide the inputs to the OS, via the control panel/settings application, to manage the computing device.

SUMMARY

In one aspect, a method is provided. A computing device receives one or more instructions for a graphics processing component of the computing device. Each instruction is associated with at least a portion of a canvas. After receipt of each instruction of the one or more instructions, the computing device determines a first portion of the canvas associated with the instruction. The computing device determines an insertion position in an instruction buffer for the instruction is determined by at least: determining an instruction in the instruction buffer and a second portion of the canvas associated with the instruction in the instruction buffer; if the second portion overlaps the first portion, then the computing device determines the insertion position based on an overlapping-instruction position, where the overlapping-instruction position is based on a position in the instruction buffer of the instruction in the instruction buffer; otherwise if the instruction in the instruction buffer is identified as being similar to the instruction, then the computing device determines the insertion position based on a second position, where the second position is based on the position in the instruction buffer of the instruction in the instruction buffer; otherwise the computing device determines the insertion position based on an ending position of the instruction buffer. The instruction in the instruction buffer is inserted at the insertion position. For each instruction in the instruction buffer, the computing device provides the instruction to the graphics processing component, and the graphics processing component performs the instruction.

In another aspect, a computing device is provided. The computing device includes a graphics processing component, a processor, and a non-transitory computer-readable storage medium having instructions stored thereon that, when executed by the processor, cause the computing device to perform functions. The functions include: (A) receiving one or more instructions for the graphics processing component, where each instruction is associated with at least a portion of a canvas, (B) after receipt of each instruction of the one or more instructions: (B1) determining a first portion of the canvas associated with the instruction; (B2) determining an insertion position in the instruction buffer for the instruction by at least: (B2a) determining an instruction in the instruction buffer; (B2b) determining a second portion of the canvas associated with the instruction in an instruction buffer; (B2c) if the second portion overlaps the first portion, then determining the insertion position based on an overlapping-instruction position, where the overlapping-instruction position is based on a position in the instruction buffer of the instruction in the instruction buffer; (B2d) otherwise if the instruction in the instruction buffer is identified as being similar to the instruction, then determining the insertion position based on a second position, where the second position is based on the position in the instruction buffer of the instruction in the instruction buffer; (B2e) otherwise, determining the insertion position based on an ending position of the instruction buffer; and (C) inserting the instruction in the instruction buffer at the insertion position.

In another aspect, an article of manufacture is provided. The article of manufacture includes a non-transitory computer-readable storage medium having instructions stored thereon that, when executed by a processor of a computing device, cause the computing device to perform functions. The functions include: (A) receiving one or more instructions for the graphics processing component, where each instruction is associated with at least a portion of a canvas, (B) after receipt of each instruction of the one or more instructions: (B1) determining a first portion of the canvas associated with the instruction; (B2) determining an insertion position in the instruction buffer for the instruction by at least: (B2a) determining an instruction in the instruction buffer; (B2b) determining a second portion of the canvas associated with the instruction in an instruction buffer; (B2c) if the second portion overlaps the first portion, then determining the insertion position based on an overlapping-instruction position, where the overlapping-instruction position is based on a position in the instruction buffer of the instruction in the instruction buffer; (B2d) otherwise if the instruction in the instruction buffer is identified as being similar to the instruction, then determining the insertion position based on a second position, where the second position is based on the position in the instruction buffer of the instruction in the instruction buffer; (B2e) otherwise, determining the insertion position based on an ending position of the instruction buffer; and (C) inserting the instruction in the instruction buffer at the insertion position.

In another aspect, a device is provided. The device includes: means for receiving one or more instructions for a graphics processing component, where each instruction is associated with at least a portion of a canvas and means for, after receipt of each instruction of the one or more instructions: determining a first portion of the canvas associated with the instruction; receiving one or more instructions for the graphics processing component, where each instruction is associated with at least a portion of a canvas, after receipt of each instruction of the one or more instructions: determining a first portion of the canvas associated with the instruction; determining an insertion position in the instruction buffer for the instruction by at least: determining an instruction in the instruction buffer; determining a second portion of the canvas associated with the instruction in an instruction buffer; if the second portion overlaps the first portion, then determining the insertion position based on an overlapping-instruction position, where the overlapping-instruction position is based on a position in the instruction buffer of the instruction in the instruction buffer; otherwise if the instruction in the instruction buffer is identified as being similar to the instruction, then determining determines the insertion position based on a second position, where the second position is based on the position in the instruction buffer of the instruction in the instruction buffer; otherwise, determining the insertion position based on an ending position of the instruction buffer; and means for inserting the instruction in the instruction buffer at the insertion position.

In one aspect, a method is provided. A computing device receives one or more instructions for a graphics processing component of the computing device. Each instruction is associated with at least a portion of a canvas. After receipt of each instruction of the one or more instructions, the computing device determines a first portion of the canvas associated with the instruction. The computing device searches an instruction buffer to identify a mergeable instruction for the instruction. The computing device, after identifying the mergeable instruction at a mergeable position within the instruction buffer, searches one or more instructions in the instruction buffer for overlap in the canvas with the first portion, where the one or more instructions include the mergeable instruction. In the event that the one or more instructions in the instruction buffer do not overlap the first portion of the canvas, the computing device merges the instruction with the mergeable instruction. For each instruction in the instruction buffer, the computing device provides the instruction to the graphics processing component, and the graphics processing component performs the instruction.

In another aspect, a computing device is provided. The computing device includes a graphics processing component, a processor, and a non-transitory computer-readable storage medium having instructions stored thereon that, when executed by the processor, cause the computing device to perform functions. The functions include: (A) receiving one or more instructions for the graphics processing component, where each instruction is associated with at least a portion of a canvas; and (B) after receipt of each instruction of the one or more instructions: (B1) determining a first portion of the canvas associated with the instruction; (B2) searching an instruction buffer to identify a mergeable instruction for the instruction; and (B3) after identifying the mergeable instruction at a mergeable position within the instruction buffer: (B3a) searching one or more instructions in the instruction buffer for overlap in the canvas with the first portion, where the one or more instructions comprise the mergeable instruction, and (B3b) in the event that the one or more instructions in the instruction buffer do not overlap the first portion of the canvas, merging the instruction with the mergeable instruction.

In another aspect, an article of manufacture is provided. The article of manufacture includes a non-transitory computer-readable storage medium having instructions stored thereon that, when executed by a processor of a computing device, cause the computing device to perform functions. The functions include: (A) receiving one or more instructions for a graphics processing component of the computing device, where each instruction is associated with at least a portion of a canvas; and (B) after receipt of each instruction of the one or more instructions: (B1) determining a first portion of the canvas associated with the instruction; (B2) searching an instruction buffer to identify a mergeable instruction for the instruction; and (B3) after identifying the mergeable instruction at a mergeable position within the instruction buffer: (B3a) searching one or more instructions in the instruction buffer for overlap in the canvas with the first portion, where the one or more instructions comprise the mergeable instruction, and (B3b) in the event that the one or more instructions in the instruction buffer do not overlap the first portion of the canvas, merging the instruction with the mergeable instruction.

In another aspect, a device is provided. The device includes: means for receiving one or more instructions for means for graphics processing, where each instruction is associated with at least a portion of a canvas; and means for, after receipt of each instruction of the one or more instructions: determining a first portion of the canvas associated with the instruction; searching an instruction buffer to identify a mergeable instruction for the instruction; and after identifying the mergeable instruction at a mergeable position within the instruction buffer: searching one or more instructions in the instruction buffer for overlap in the canvas with the first portion, where the one or more instructions comprise the mergeable instruction, and in the event that the one or more instructions in the instruction buffer do not overlap the first portion of the canvas, merging the instruction with the mergeable instruction.

DETAILED DESCRIPTION

Overview

Figure 1A:
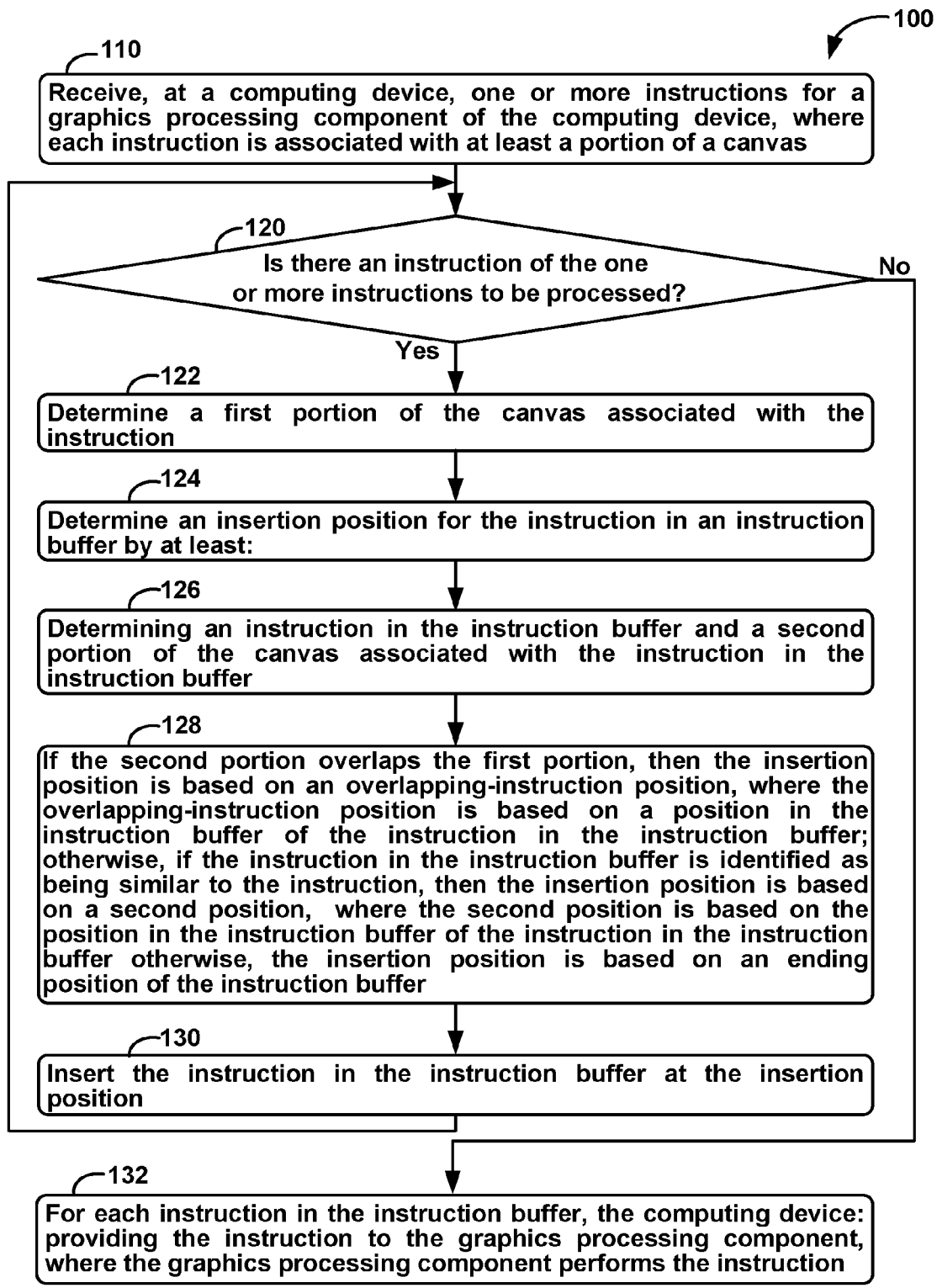
FIG. 1A is a flow chart of a method, in accordance with an example embodiment.

Disclosed herein are techniques for reordering graphics processing instructions for efficiency. Many computing devices, such as many modern mobile phones, are equipped with one or more graphics processing components, such as one or more Graphics Processing Units (GPUs), and related software for utilizing the graphics processing components, such as graphics libraries; e.g., OpenGL®.

Many graphics processing units are configured to receive and execute instructions to draw images on a canvas. Examples of these instructions include instructions to draw text, draw an image from an image file or bitmap, render a list of items, translate (i.e., move) a point of view, and specify a clipping (i.e., visibility) rectangle. A canvas can be an area of memory and/or other components configured for storing, drawing, and/or displaying graphical data. Examples of the canvas include, but are not limited to, displays, frame buffers, video buffers, drawables, drawable regions, and video memory.

The graphics processing component can use a "rendering pipeline" to draw text, shapes, images, etc. to the canvas. The rendering pipeline uses a collection of components to execute the instructions for the graphics processing component to generate an image stored in a frame buffer acting as a canvas. The frame buffer can store pixel data for each pixel of a display, where one pixel, or picture element, is the smallest changeable portion of a display. Each pixel in the frame buffer can be mapped to a corresponding pixel of the display, so that changing data for a pixel in the frame buffer can cause the display to correspondingly change the light emitted to display the pixel. For example, consider a display of size R rows and C columns, or in other words, a display that has R×C pixels. A corresponding frame buffer that is mapped to the display can include storage for each of the R×C pixels.

The rendering pipeline can include "shaders", which are programs provided by graphics libraries and/or applications using the graphics pipeline. Each shader allows the application to customize part of the graphics pipeline by controlling processing of data in the graphics pipeline. For example, a shape can be specified to the graphics pipeline based on a number of points that can be referred to as vertices. As an example, a vertex shader can be used to control the color of a vertex. To draw a blue rectangle specified using four vertices (one per corner), the vertex shader can specify that each vertex of the rectangle should be colored blue. Other components of the graphics pipeline are predetermined components, such as a rasterizer that can convert a primitive into a patch, or collection of pixels, that represent the primitive.

The order of instructions provided to the graphics processing component can affect rendering performance. For example, a first set of shaders can be associated with a first instruction and a second set of shaders can be associated with a second instruction. The graphics processing unit can perform the first instruction using the first set of shaders. To perform the second instruction, the graphics processing unit can switch out the first set of shaders and switch in the second set of shaders. However, switching shaders consumes time and graphics processing component resources, which affects rendering performance. As another example, other aspects of graphics processing that change on a per-instruction basis can affect rendering performance. Examples of these aspects include, but are not limited to, shader input (e.g., a matrix, a color), a bitmap/texture being used, a clipping region, and a blending mode.

Similar instructions tend to use the same shaders and have the same aspects of graphics processing. Thus, similar instructions can be sorted and/or merged to reduce the amount of time and resources used for graphics processing. The similarity of instructions can be determined based on a rendering state of the graphics pipeline for each operation. Sorting and/or merging instructions based on similarity can reduce the overhead; e.g., time and resources used in switching shaders to draw an image.

One technique for determining similarity of instructions is based on a visible object type (VOT) assigned to each instruction. Instructions can be sorted by the associated VOT. VOTs can generally correspond to rendering states, shader selection, and use of similar graphics primitives. For example, suppose a rendering pipeline supports DrawRect, DrawTriangle, and DrawText instructions, where the DrawRect instruction renders one or more rectangles, the DrawTriangle instruction renders one or more triangles, and the DrawText instruction draws text. The DrawRect and DrawTriangle instructions can each use one set of graphics primitives and shaders to draw triangles and rectangles, while the DrawText instruction can use a different set of graphics primitives and shaders to draw text. As rectangles and triangles are both shapes, a VOT of "shape" can be used for both the DrawRect and DrawTriangle instructions, while a VOT of "text" can be used for the DrawText instruction Then, if the same shaders and graphics primitives are used by all instructions having a common VOT, sorting instructions by VOT can generate a group of instructions that uses the same shaders. Then, the shaders and primitives need only be changed, at most, just before and just after the group of instructions having the same VOT.

In some embodiments, the instructions can be combined to perform multiple operations with a single instruction. For example, a single draw text instruction can be provided with multiple texts and corresponding display locations to render all of texts on a display. By combining instructions, any per-instruction overhead can be reduced as the number of instructions is reduced.

Overlap of instructions can be considered to ensure an image drawn using merged and/or sorted instructions is correct. For example, suppose a series of instructions for a graphics processing component are ordered for first-to-last drawing—that is, the first received instruction is to be drawn first, then the second received instruction is drawn at the same time as or after the first instructions, and so on until the last received instruction is drawn. Changing an order of drawing instructions ordered for first-to-last drawing can cause an image to be incorrectly drawn.

To preserve first-to-last ordering and to take overlap into account, received instructions can be stored in an instruction buffer. Upon receipt of a new instruction, the instruction buffer can be searched in reverse order for sorting and/or merging the new instruction with instruction(s) in the instruction buffer. This search can take overlapping drawing regions of the canvas associated with the new instruction into account. By searching in reverse order and taking overlapping into account, first-to-last drawing ordering can be preserved, and so resulting images can be drawn correctly.

Further, combinations of sorting and merging instructions can additionally reduce overhead. For example, when a plurality of operations are sorted and then merged, the sorting step can bring similar instruction together into a consecutive group of operations. Then, subsequently merging the consecutive group of instructions can replace the consecutive group of instructions with potentially only one instruction. This combination of sorting and then merging instructions can reduce overhead both due to changing shaders and in processing instructions.

Example Operations

FIG. 1A is a flow chart of method 100, in accordance with an example embodiment. Method 100 begins at block 110, where a computing device can receive one or more instructions for a graphics processing component of the computing device, where each instruction is associated with at least a portion of a canvas.

At block 120, the computing device can begin a loop to process each instruction in the received one or more instructions. If no instructions remain to be processed, the loop can terminate and method 100 can proceed to block 132. In some examples, instructions can arrive one at a time, and so the loop need only iterate once to process the one instruction.

At block 122, the computing device can determine a first portion of the canvas associated with the instruction.

At block 124, the computing device can determine an insertion position for the instruction in an instruction buffer by carrying out at least the techniques of blocks 126, 128, and 130.

At block 126, the computing device can determine an instruction in the instruction buffer and can determine a second portion of the canvas associated with the instruction.

At block 128, if second portion overlaps first portion, then the computing device can determine the insertion position based on an overlapping-instruction position. The overlapping-instruction position can be based on a position in the instruction buffer of the instruction in the instruction buffer. Otherwise, if the instruction in the instruction buffer is identified as being similar to the instruction, then the computing device can determine the insertion position based on a second position. The second position can be based on the position in the instruction buffer of the instruction in the instruction buffer. Otherwise, the computing device can determine the insertion position based on an ending position of the instruction buffer.

In some embodiments, the instruction can be associated with a VOT. In these embodiments, determining whether the instruction in the instruction buffer is identified as being similar to the instruction can include: determining a VOT associated with the instruction in the instruction buffer; determining whether the VOT associated with the instruction in the instruction buffer is the particular VOT; and after determining that the VOT associated with the instruction in the instruction buffer is the particular VOT, determining that the instruction in the instruction buffer is similar to the instruction. In particular of these embodiments, the VOT can be a type selected from the group consisting of a point type, a line type, a shape type, an image type, and a text type.

In other embodiments, the instruction has a beginning position that begins the instruction buffer, the ending position can end the instruction buffer, and the instruction buffer can store at least one instruction. Then, determining the insertion position can include: setting a search position to an initial search position that is based on the ending position; determining an instruction at the search position in the instruction buffer; determining a third portion of the canvas associated with the instruction at the search position of the instruction buffer; determining whether the third portion overlaps the first portion; after determining that the third portion overlaps the first portion, determining that the overlapping-instruction position is the search position; and otherwise: determining whether the instruction at the search position of the instruction buffer is similar to the instruction, and after determining that the instruction at the search position of the instruction buffer is identified as being similar to the instruction, then determining that the second position is the search position.

In particular of the other embodiments, method 100 can further include: after determining that the third portion does not overlap the first portion and determining that the instruction at the search position of the instruction buffer is not similar to the instruction: determining whether the instruction at the search position of the instruction buffer is a most-similar instruction, where the most-similar instruction is an instruction that is closest in similarity to the instruction and that has been searched in the instruction buffer; if the instruction at the search position of the instruction buffer is a most-similar instruction, then storing a position in the instruction buffer associated with the most-similar instruction; and decrementing the search position.

In some of the particular of the other embodiments, after decrementing the search position, determining whether the search position is before the beginning position; and after determining that the search position is before the beginning position, inserting the instruction into the instruction buffer at the position in the insertion buffer associated with the most-similar instruction.

In other embodiments, determining the insertion position for the instruction based on the second position includes determining the insertion position to be a position immediately after the second position.

At block 130, the computing device can insert the instruction in the instruction buffer at the insertion position. After completing block 130, method 100 can proceed to block 120.

At block 132, for each instruction in the instruction buffer, the computing device can provide the instruction to the graphics processing component. The graphics processing component then can perform the instruction. In some embodiments, the graphics processing component can perform the instruction using a rendering pipeline, where the rendering pipeline includes one or more shaders.

In particular of these embodiments, providing the instruction to the graphics processing component can include providing information about a shader for use in the rendering pipeline. In some of the particular embodiments, providing information about the shader for use in the rendering pipeline can include providing the shader to the graphics processing component. In other particular of these embodiments, providing information about the shader for use in the rendering pipeline includes providing, to the graphics processing component, a reference to the shader. In even other of these embodiments, the one or more shaders include a shader selected from the list of shaders comprising a vertex shader, a geometry shader, and a fragment shader. In still other embodiments, providing information about the shader can include determining the shader based on the VOT associated with the instruction.

Method 100 can end when all of the instructions in the instruction buffer are performed.

Figure 1B:
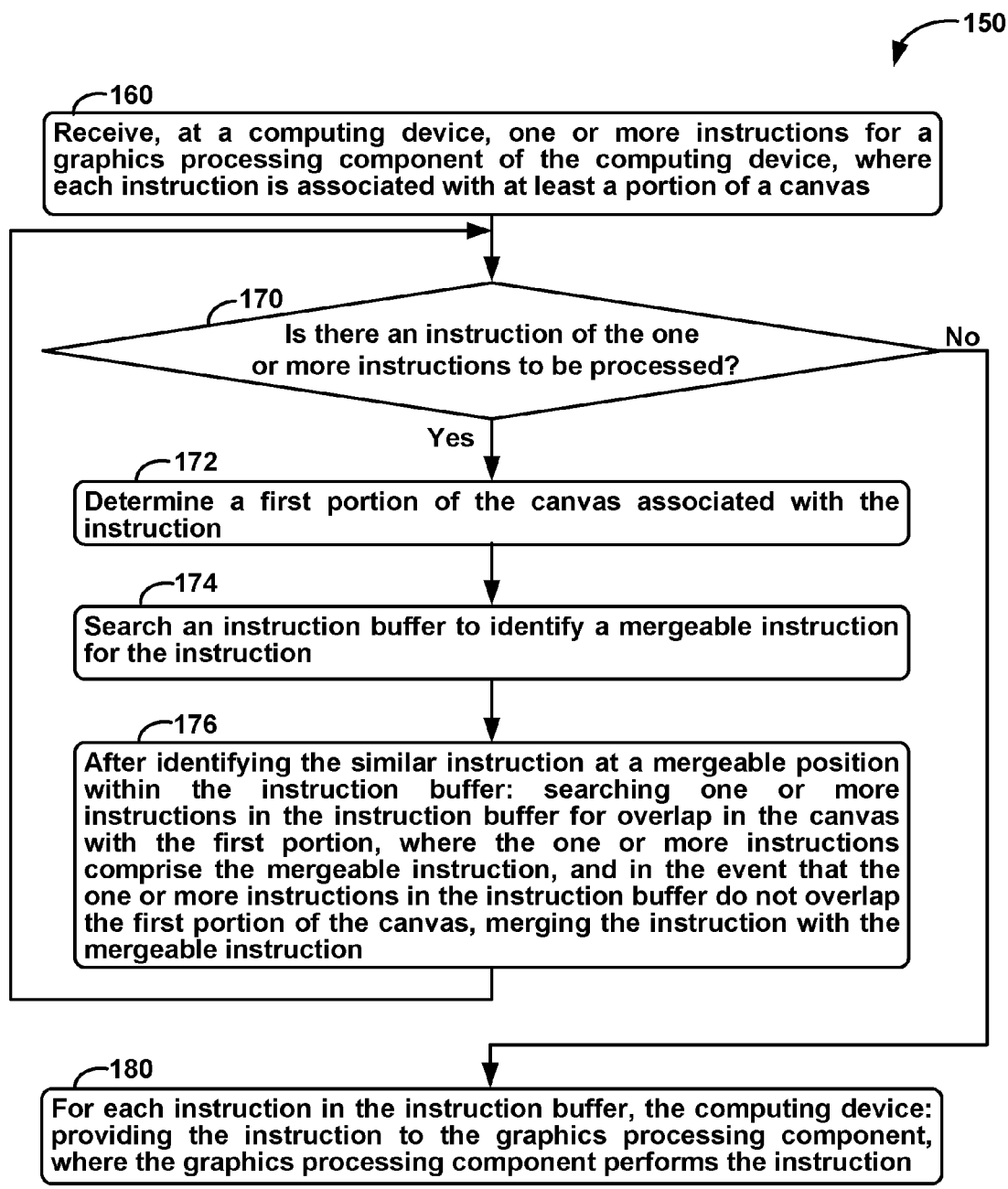
FIG. 1B is a flow chart of another method, in accordance with an example embodiment.

FIG. 1B is a flow chart of method 150, in accordance with an example embodiment. Method 150 begins at block 160, where a computing device can receive one or more instructions for a graphics processing component of the computing device, where each instruction is associated with at least a portion of a canvas.

At block 170, the computing device can begin a loop to process each instruction in the one or more instructions. If no instructions remain to be processed, the loop can terminate and method 150 can proceed to block 180.

At block 172, the computing device can determine a first portion of the canvas associated with the instruction.

At block 174, the computing device can search an instruction buffer to identify a mergeable instruction for the instruction.

At block 176, after identifying the mergeable instruction at a mergeable position within the instruction buffer, the computing device can: search one or more instructions in the instruction buffer for overlap in the canvas with the first portion, where the one or more instructions comprise the mergeable instruction. In the event that the one or more instructions in the instruction buffer do not overlap the first portion of the canvas, the computing device can merge the instruction with the mergeable instruction.

After completing block 176, method 150 can proceed to block 170.

In some embodiments, the instruction buffer has a beginning position that begins the instruction buffer and an ending position that ends the instruction buffer, and the instruction buffer can store at least one instruction. In these embodiments, searching the one or more instructions in the instruction buffer for overlap in the canvas with the first portion can include: setting an overlap-search position to the ending position of the instruction buffer. Then, at the overlap-search position: an overlap-search instruction at the overlap-search position can be determined; a second portion of the canvas associated with the overlap-search instruction can be determined; in the event that the first portion of the canvas overlaps the second portion, a determination can be made that the searched one or more instructions do overlap the instruction; otherwise: the overlap-search position can be decremented and, in the event that the decremented overlap-search position is less than the mergeable position, a determination can be made that the searched one or more instructions do not overlap the instruction.

In particular embodiments, the instruction can be associated with a particular VOT. Then, searching an instruction buffer to identify the mergeable instruction for the instruction can include: forming a merging key for the instruction, wherein the merging key comprises the VOT for the instruction; performing a hash lookup in a hash table associated with the instruction buffer utilizing the merging key; and in response to finding a match in the hash table for the merging key, determining that the mergeable instruction is an instruction in the hash table associated with the merging key.

In specific of these embodiments, the VOT can be a type selected from the group consisting of a point type, a line type, a shape type, an image type, and a text type.

In still other embodiments, merging the instruction and the second instruction can include: the computing device generating a merged instruction by merging the instruction and the mergeable instruction; and the computing device replacing the mergeable instruction in the instruction buffer with the merged instruction.

At block 180, for each instruction in the instruction buffer, the computing device can provide the instruction to the graphics processing component. The graphics processing component then can perform the instruction.

In some embodiments, the graphics processing component performing the instruction can include the graphics processing component performing the instruction using a rendering pipeline, where the rendering pipeline includes one or more shaders. In particular of these embodiments, providing the instruction to the graphics processing component can include providing information about a shader for use in the rendering pipeline. In some of the particular embodiments, providing information about the shader for use in the rendering pipeline can include providing the shader to the graphics processing component. In other particular of these embodiments, providing information about the shader for use in the rendering pipeline includes providing, to the graphics processing component, a reference to the shader. In even other of these embodiments, the one or more shaders include a shader selected from the list of shaders comprising a vertex shader, a geometry shader, and a fragment shader. In still other embodiments, providing information about the shader can include determining the shader based on the VOT associated with the instruction.

In particular of these embodiments, method 150 additionally can include: after determining that the searched one or more instructions do overlap the instruction: determining a most-similar instruction of the searched one or more instructions, wherein the most-similar instruction is an instruction that is closest in similarity to the instruction; determining a most-similar position in the instruction buffer for the most-similar instruction; and inserting the instruction into the instruction buffer at a position that is based on the most-similar position.

Method 150 can end when all of the instructions in the instruction buffer are performed.

Example Graphics Processing Components

Figure 2A:
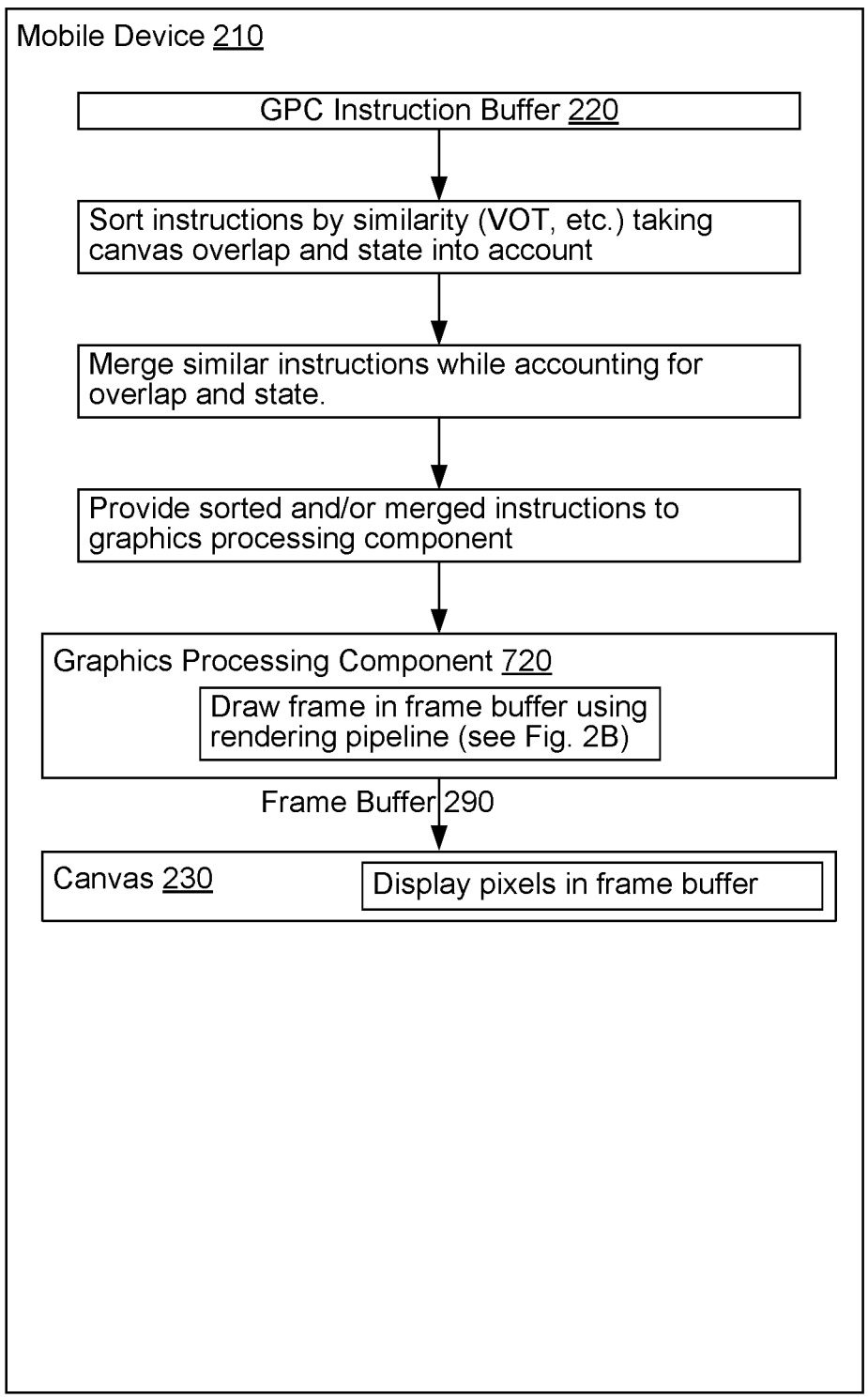
FIGS. 2A and 2B are block diagrams of an example mobile device with a graphics processing component, in accordance with an example embodiment.
Figure 2B:
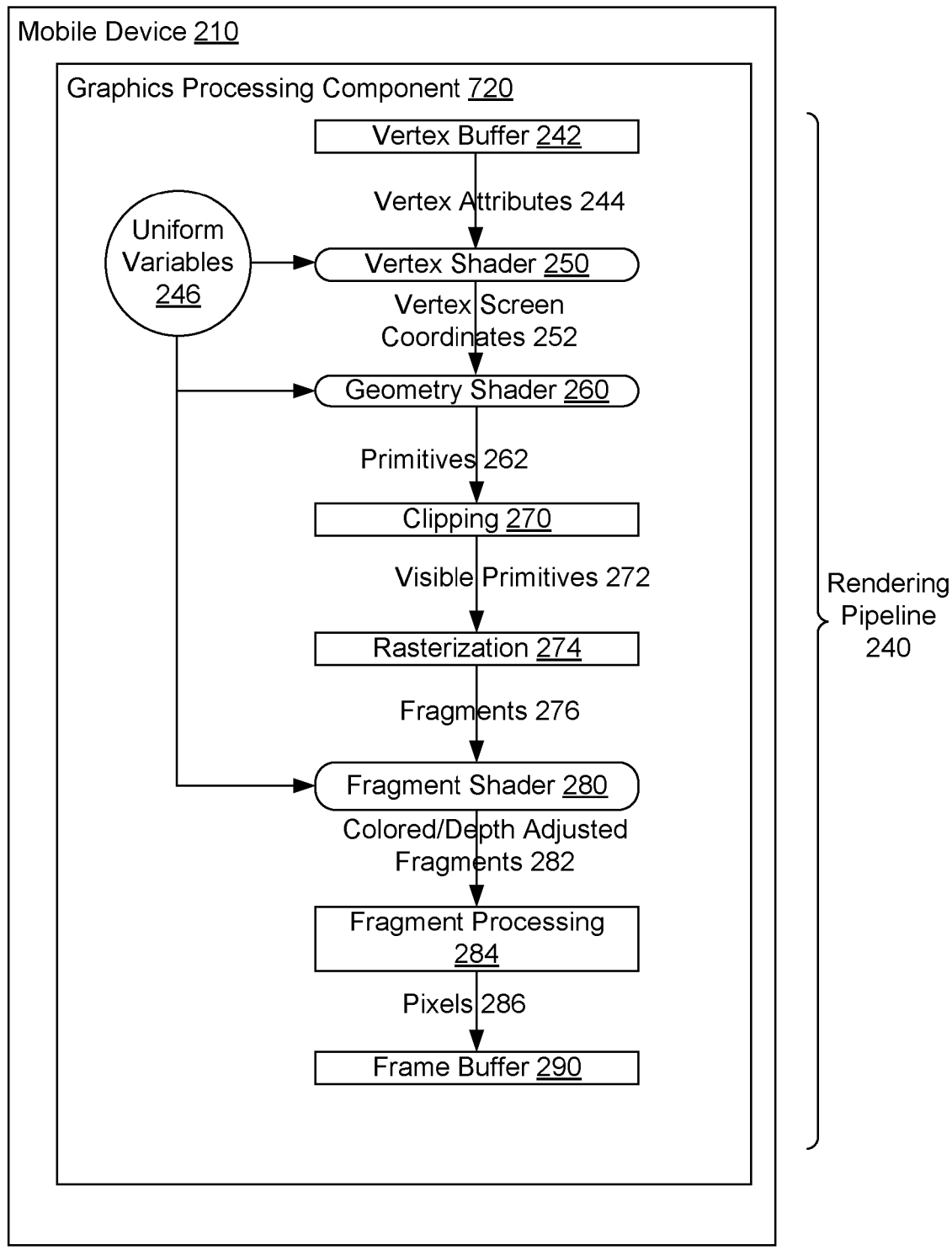

FIGS. 2A and 2B are block diagrams of example mobile device 210 with a graphics processing component 720, in accordance with an example embodiment. FIG. 2A is a block diagram of mobile device 210 with a graphics processing component 720 configured to provide output to a canvas 230.

Mobile device 210 can be a computing device, such as computing device 700, configured for graphics processing. For example, mobile device 210 can include graphics processing component (GPC) instruction buffer 220 for storing instructions for graphics processing component 720. Each instruction can be associated with a VOT, such as, but not limited to, type(s) for a clip rectangle, type(s) for point(s) of view, type(s) for drawable or visible object(s), type(s) for lists of drawable objects, and combinations thereof.

Drawable or visible objects can include, but are not limited to, points, lines, shapes, images, and text. Instruction(s) related to a point of view, such as a point of view for viewing/displaying drawable object(s), can include, but are not limited to, instruction(s) to translate, or move, the point of view, instruction(s) to rotate the point of view, and combinations thereof. Instruction(s) associated with lists of objects can include instruction(s) for managing and drawing lists of objects, instruction(s) to create a list of drawable objects, instruction(s) to add items to the list of drawable objects, instruction(s) to remove items from the list of drawable objects, instruction(s) to update one or more items in the list of drawable objects, instruction(s) to delete a list of drawable objects, instruction(s) to draw some or all of the objects in the list of drawable objects, and combinations thereof.

Instruction(s) associated with drawable object(s) can include, but are not limited to, instruction(s) to draw one or more points, instruction(s) to draw one or more lines, instruction(s) to draw one or more shapes, instruction(s) to draw one or more images, instruction(s) to draw one or more text items, and combinations thereof. Instruction(s) associated with images can include instruction(s) to draw a bitmap, or representation of pixels in an image where one or more bits in the bitmap correspond to one pixel in the image. Instruction(s) for transforming objects can include, but are not limited to, instruction(s) to rotate one or more drawable objects, instruction(s) to translate one or more drawable objects, instruction(s) to scale one or more drawable objects, and combinations thereof.

Mobile device 210 can receive graphics processing component instructions, store the instruction in graphics processing component instruction buffer 220, and operate on the stored instructions in graphics processing component instruction buffer 220.

FIG. 2A shows that mobile device 210 can sort instructions for a graphics processing component by similarity. The similarity of instructions can be determined based on a rendering state of the graphics pipeline for each operation. The rendering state can include aspects of the graphics pipeline, including but not limited to: shader(s) used by the instruction, shader parameter(s) used by the instruction, transformation matrix/matrices for the instruction, a point of view for the instruction, partial or complete shape(s) drawn by the instruction, a type of the instruction, a portion of the canvas associated with the instruction, and combinations thereof.

For one example of similarity, a bounded image can be drawn by drawing a boundary rectangle (or other shape) and mapping image data from one or more texture maps, or associated image(s), to pixel(s) in an interior of the boundary rectangle. In this case, instructions associated with texture maps can be considered to be similar.

Another technique for determining similarity of instructions is based on a visible object type, or VOT, assigned to each instruction. VOTs can generally correspond to rendering states. For example, if the same shaders are used by all instructions sharing a common VOT, sorting instructions by VOT can generate a group of instructions all having the common VOT, and thus all of the instructions in the group can use the same shaders. Then, the shaders need only be changed, at most, just before and just after the group of instructions having the same VOT.

Sorting instructions by similarity can take rendering state and perhaps canvas overlap into account. For example, suppose that the instruction(s) for drawing drawable objects include a "DrawPoint" instruction for drawing points with an example VOT of "Point", a "DrawLine" instruction for drawing lines with an example VOT of "Line", a "DrawShape" instruction for drawing shapes with an example VOT of "Shape", a "DrawBitmap" instruction to draw images stored as bitmaps with an example VOT of "Image", and a "DrawText" instruction to draw text with an example VOT of "Text". Then, mobile device 210 can sort instructions stored in graphics processing component instruction buffer 220 so that instructions with the same VOT are next to each other in graphics processing component instruction buffer 220, the DrawBitmap instructions, each having a VOT of "Image", are next to each other in graphics processing component instruction buffer 220, and so on.

A series of instructions for a graphics processing component can be ordered for first-to-last drawing. For example, suppose a series of instructions for a graphics processing component I1, I2, ..., In, n>2, are provided to a computing device, where each instruction is associated with at least a portion of a canvas. If the instructions I1, I2, ..., In are ordered for first-to-last drawing, then (i) instruction I1 is drawn first, since I1 is received first, (ii) instruction I2 is drawn at the same time as or after instruction I1, since I2 is received after I1, (iii) instruction I3 is drawn at the same time as or after instruction I2, since I3 is received after I1 and I2, and so on until (n) the last instruction In is drawn.

In some cases, changing an order of drawing instructions ordered for first-to-last drawing can cause an image to be incorrectly drawn. For example, suppose the image includes two shapes: S1 and S2, with S2 drawn partially on top of S1, and the instructions include a first instruction to DrawShape (S1) and a second instruction to DrawShape(S2). S1 and S2 can be said to overlap, since S2 at least partially covers S1. Changing the order of the DrawShape instructions; e.g., performing the DrawShape(S2) instruction before the DrawShape(S1) instruction, can cause the resultant image to be incorrect, since S2 would be drawn below S1 rather than correctly being drawn partially on top of S1. Correctness of an image drawn using instructions involving overlapping drawable objects can be preserved when the order of drawing the overlapping drawable objects is preserved. In this example, correctness of the image is preserved if S1 is drawn before S2.

To preserve first-to-last ordering and to take overlap into account, received instructions can be stored in an instruction buffer. Upon receipt of a new instruction, the instruction buffer can be searched in reverse order for sorting and/or merging the new instruction with instruction(s) in the instruction buffer taking overlapping drawing regions of the canvas for the instructions into account. If the new instruction is not merged or inserted into the instruction buffer for sorting, the new instruction can be inserted at the end of the instruction buffer or near a most-similar instruction. By searching in reverse order and taking overlapping into account, first-to-last drawing ordering can be preserved, and so resulting images can be drawn correctly.

In some embodiments, first-to-last drawing ordering can preserve depth ordering (Z ordering) that is implied by the first-to-last drawing ordering. In other embodiments, first-to-last drawing ordering may not preserve depth ordering; for example, the instructions in the instruction buffer can be used to draw a user interface or other imagery atop a frame of an already-rendered image where depth ordering can be set explicitly as part of the geometry, such as a frame of a three-dimensional video game or architectural/mechanical rendering.

In other cases, changing a state of the graphics processing component while drawing an image can change the image. The state can be based on information, such as but not limited to, scaling information, translation information, shearing/skewing information, perspective information, and rotation information. The information about the state of the image can be aggregated in a matrix. A matrix can be associated with each instruction of the state of the image.

For example, suppose three instructions are provided:
DrawBitmap B1 at 0, 0
TranslateY by 10 pixels
DrawBitmap B2 at 100, 0

Let M1 be a matrix associated with the first DrawBitmap command which is indicates that the first bitmap B1 is to be drawn at (x, y) position (0, 0); i.e., without translation. The TranslateY command can indicate that coordinates for the image are to be moved, or translated, by 10 pixels in the Y dimension—this translation information can be used to update the matrix M1 to a new matrix M2. Then, if M2 is used in drawing the second DrawBitmap command, the effect of drawing bitmap B2 at position (100, 0) includes a translation in the Y dimension of 10 pixels. After translation, bitmap B2 would be drawn at position (100, 10). In some embodiments, one matrix can be stored and updated rather than using separate matrices; e.g., a matrix M that is initialized to the values of M1 and then updated with the above-mentioned translation in the Y dimension to have the values of M2.

In some embodiments, the matrix can be used to determine overlaps; e.g., boundary areas associated with first and second instructions can be transformed by the matrix to determine respective first and second regions of a canvas covered by the first and second instruction. Then, if the first and second regions overlap, the first and second instructions can be considered to be overlapping; otherwise, the first and second instructions can be considered to be non-overlapping.

The order of instructions that change the state of the graphics processing component can be preserved to ensure correctness of resultant images. Also, the relative order of state change and drawing instructions can be preserved to ensure correctness of resultant images.

One sorting technique for sorting instructions taking overlap and state into account can include mobile device 210 receiving an instruction NI for graphics processing component 720. Mobile device 210 can maintain an instruction buffer, such as graphics processing component instruction buffer 220. To start the sorting technique, mobile device 210 can receive the instruction NI. Mobile device 210 can then search to find a position to insert NI into the instruction buffer. Mobile device 210 can initially set a current position CP at an ending position EP storing an instruction in the instruction buffer. For example, suppose that 3 instructions I1, I2, and I3 are stored in the instruction buffer at respective positions 1, 2, and 3. Then, the ending position EP storing an instruction is position 3, and so mobile device can start at position 3. Also, a beginning position BP can be determined as a first position storing an instruction; e.g., the beginning position can be position 1.

The sorting technique can continue at a LOOPSTART location by letting CI be a current instruction stored at position CP. If the current instruction CI changes a state of graphics processing component 720 or if an object drawn by instruction NI at least partially overlaps an object drawn by instruction CI; i.e., instruction NI overlaps instruction CI, then insert the new instruction NI at a position immediately after CP; e.g., at position CP+1.

One approach to approximately determine overlap between instructions NI and CI can involve determining a bounding box BNI that bounds the object drawn using instruction NI and determining a bounding box BCI that bounds the object drawn using instruction CI. Then, it can be determined that instruction NI at least partially overlaps (or does not overlap) instruction CI when BNI at least partially overlaps (or does not overlap) BCI. Other approaches for determining overlapping and not overlapping instructions are possible as well. In some embodiments, multiple bounding boxes can be used, such as in a 3D rendering scenario.

The sorting technique can continue by comparing similarity criteria, such as but not limited to a VOT, associated with instruction NI with similarity criteria associated with instruction CI; e.g., the VOT associated with an instruction can be stored in the instruction buffer along with the instruction. If the similarity criteria associated with instruction NI matches, or nearly matches, the similarity criteria associated with instruction CI, the new instruction NI can be inserted at a position immediately after CP. Otherwise, the similarity criteria associated with instruction NI does not match the similarity criteria associated with instruction CI—in this case, decrement the current position; e.g., let CP equal the value of CP−1. If CP is now at a position before the beginning position BP, insert NI at beginning position BP of the instruction buffer; e.g., if BP is 1 and CP is 0 (or less), then insert NI at BP=position 1 of the instruction buffer. If CP is not before BP, the sorting technique can loop back to the above-mentioned LOOPSTART.

If no similarity criteria associated with instruction NI match (or nearly match) similarity criteria for any instruction stored in the instruction buffer, then instruction NI can be stored at the ending position EP. In other embodiments, when no similarity criteria associated with instruction NI match (or nearly match) similarity criteria for any instruction stored in the instruction buffer, an instruction MSI stored in the instruction buffer can be determined, where the similarity criteria for instruction MSI are the most similar to the similarity criteria associated with instruction NI. Then, instruction NI can be inserted into the instruction buffer a position associated with instruction MSI; e.g., directly after the position of instruction MSI.

For example, suppose that 3 instructions I1, I2, and I3 are stored in the instruction buffer at respective positions 1, 2, and 3, each of I1, I2, and I3 having respective similarity criteria. Let MT be a matching threshold between similarity criteria of a new instruction, such as NI, and an instruction stored in the instruction buffer, where MT is, in this example, set to 80% —other values of MT (e.g., 100%, 90%, 50%) are possible as well. Thus, if the similarity criteria of instruction NI match similarity criteria of an instruction stored in the instruction buffer by at least MT %, then the instruction NI can be determined to (nearly) match the instruction stored in the buffer. In this example, suppose that similarity criteria for instruction NI and the similarity criteria of each respective instruction I1, I2, I3 have match at 90%, 25%, and 10%. As similarity criteria for instruction NI match the similarity criteria of instruction I1 at 90%, which exceeds threshold MT, then NI can be determined to nearly match instruction I1. Then, NI can be inserted into the instruction buffer at a position based on the matching instruction; e.g., directly after the position of instruction I1.

As another example, suppose that similarity criteria for instruction NI and the similarity criteria of each respective instruction I1, I2, I3 have match at 20%, 25%, and 10%. Then, the similarity criteria for instruction NI do not match the similarity criteria any stored instruction by at least the threshold MT, then NI can be determined not to match, or not to be similar to any stored instruction. However, the highest similarity criteria of 25% is between instruction NI and instruction I2, so the most-similar instruction MSI in this example can be instruction I2. Then, NI can be inserted into the instruction buffer at a position based on the position of the MSI; e.g., directly after the position of instruction I2.

Once instructions for graphics processing component 720 have been sorted after taking overlap and state into account as needed, instructions with the same instruction can be merged, again while taking overlap and state into account. A merging technique can then be used to merge instructions in an instruction buffer that takes overlap and state into account. The merging technique can operate on an instruction buffer with beginning and ending positions as described above in the context of the sorting technique.

One merging technique can involve use of a hash table associated with the instruction buffer. A merging key can be formed for each instruction received and then stored in the instruction buffer. In some embodiments, the merging key can be the VOT for the instruction. In other embodiments, the merging key can include, but is not limited to: the VOT for the instruction, a color associated with the instruction; e.g., a text color, a reference associated with the instruction; e.g., a pointer for a bitmap, an anti-aliasing indicator associated with the instruction, a blend-mode value/indicator, and combinations thereof. Other merging keys are possible as well.

After forming the merging key, the hash table can be searched by presenting the merging key to the hash table. If no matching instruction is found in the hash table, then the instruction may not be mergeable, and so the instruction can be inserted into the instruction buffer; e.g., at the ending position EP of the instruction buffer. Otherwise, if matching instruction MI is found in the hash table, instruction MI can be considered as a mergeable instruction. Let MI be stored at mergeable position MP in the instruction buffer, where the beginning BP≤MP≤EP. Then, each instruction from mergeable position MP to ending position EP in the insertion buffer can be searched for overlap with the instruction using the overlap determination techniques discussed above.

If no overlapping instruction is found between MP and EP, then the instruction can be merged with the mergeable instruction MI at position MP of the instruction buffer. If one of the instructions between MP and EP does overlap the instruction, then a most-similar instruction to the instruction can be determined and the instruction can be inserted after the most-similar instruction. Similarity of instructions can be determined using the techniques discussed above. Another technique that can be used is to use a hash table with a simple merging key to the instruction; e.g., VOT only, and to find a most-similar instruction MSI in the instruction buffer after the position MP that matches the simple merging key. If instructions between a most-similar position MSP of instruction MSI and ending position EP do not overlap the instruction, then the instruction can be inserted after the MSP; otherwise the instruction can be inserted at the EP.

Another merging technique can include initializing a value of a current position CP to the beginning position BP. The merging technique can continue at a LOOPSTART2 location, where the value of the current position CP can be compared to the ending position EP. If CP is greater than or equal to ending position EP, then the merging technique can end. Otherwise, let current instruction CI be the instruction at position CP, and let next instruction NI be the instruction at position CP+1. If a VOT associated with current instruction CI is the same as a VOT associated with next instruction NI and if neither instruction CI nor instruction NI changes a state of graphics processing component 720 and if current instruction CI and next instruction NI do not overlap, then merge the next instruction NI into the current instruction CI. Otherwise, either the VOTs differ, the state is changed, or instructions CI and NI overlap, so do not merge CI and NI; rather, increment the current position CP; e.g., let a value of CP be set equal to the value of CP+1. Then, after incrementing CP, the merging technique can loop back to the above-mentioned LOOPSTART2 location. Other sorting and/or merging techniques are possible as well.

For example, suppose one instruction to graphics processing component 720 is a DrawText instruction that takes a number of triples as parameters: an x value, a y value, and a text reference; e.g., a string or pointer to string. Then, graphics processing component 720 can perform the DrawText instruction by drawing the "text reference" at a screen position of "x value", "y value". Further suppose that, if two or more triples are provided to the DrawText instruction; e.g., DrawText(x1, y1, "text 1", x2, y2, "text 2", . . . ), then graphics processing component 720 can draw each text reference in an indeterminate order e.g., sometimes "text 1" can be drawn before "text 2" and other times "text 2" is drawn before "text 1".

Continuing this example, suppose instructions in graphics processing component instruction buffer 220 include three consecutive instructions: DrawText(0, 200, "text 1"); DrawText(0, 0, "text 2"); Draw Text(0, 100, "text 3"). In this example, let these three example text references each take 50 vertical or y pixels to draw, so that drawing text at (0, 200) does not overlap text drawn at (0, 0) or at (0, 100), since there is more than 50 vertical pixels between y pixel position 200 and each of y pixel positions 0 and 100. However, text drawn at (0, 200) would overlap text drawn at (0, 180) or (0, 220), since there are fewer than 50 vertical pixels between y pixel position 200 and each of y pixel positions 180 and 220.

Since the three consecutive instructions do not overlap, then the three instructions can be merged into a single DrawText instruction: DrawText(0, 200, "text 1", 0, 0, "text 2", 0, 100, "text 3"). However, if the DrawText(0, 0, "text 2") instruction was replaced with an instruction DrawText(0, 180, "text 2"), then DrawText(0, 200, "text 1") could not be merged with the DrawText(0, 180, "text 2") instruction since the order of drawing the text references is indeterminate. In this example, the Draw Text(0, 100, "text 3") instruction can still be merged with either the DrawText(0, 200, "text 1") instruction or the DrawText(0, 180, "text 2") instruction.

Sorting instructions by similarity and merging instructions can be performed as indicated in FIG. 2A, which shows an example where sorting precedes merging. In some embodiments, sorting can be performed without merging; while in other embodiments, merging can be performed without sorting. In even other embodiments, merging can be performed before sorting; e.g., to reduce the total number of instructions to be sorted. In particular of these even other embodiments, a second merging pass can be performed after sorting to further reduce the number of instructions after sorting.

In other embodiments, sorting and merging can be performed as aspects of one operation—for example, once two instructions have been determined to be similar and non-overlapping, then the two similar and non-overlapping instructions can be merged.

After the instructions in instruction buffer 220 have been sorted and/or merged, the instructions in instruction buffer 220 can be provided to graphics processing component 720 in an order from the beginning position BP to ending position EP. In some embodiments, mobile device 210 can provide a stream of instructions to graphics processing component 720 for performance. In other embodiments, mobile device 210 can provide a reference to instructions, such as a pointer or other reference to graphics processing component instruction buffer 220, to graphics processing component 720 for performance.

Upon receiving instruction(s) from mobile device 210, graphics processing component 720 can perform the provided instructions to draw an image. For example as discussed immediately below in the context of FIG. 2B, graphics processing component 720 can perform the instructions using a rendering pipeline to draw an image stored in a frame buffer, or region of memory configured to store pixels of an image for display.

Canvas 230 includes an area of memory and/or other components configured for storing, drawing, and/or displaying graphical data. Examples of canvas 230 include, but are not limited to, displays, frame buffers, video buffers, drawables, drawable regions, and video memory. In some embodiments, providing graphical data for one or more portions of canvas 230 can cause immediate or nearly immediate display. For example, if canvas 230 is or is associated with a display that displays 30 frames or images per second, the provided graphical data can be displayed within one (or, in particular scenarios, two) frame display intervals of 1/30th of a second.

Upon reception of a frame buffer, such as frame buffer 290, a display associated with canvas 230 can display the image stored in the frame buffer nearly immediately. In other embodiments, providing graphical data for one or more portions of canvas 230 does not cause the provided graphical data to be (nearly) immediately displayed. For example, an example canvas 230 can be an inactive frame buffer; i.e., currently not displayed frame buffer. When all graphical data for a desired image has been provided to the inactive frame buffer, the inactive frame buffer can be made active; i.e., made available for display.

FIG. 2B is a block diagram of mobile device 210 with a graphics processing component 720 that includes rendering pipeline 240. Rendering pipeline 240 includes vertex buffer 242, uniform attributes 246, vertex shader 250, geometry shader 260, clipping component 270, rasterization component 274, fragment shader 280, fragment processing component 284, and frame buffer 290. In some embodiments, frame buffer 290 is dedicated to graphics pipeline 240, while in other embodiments, frame buffer 290 is not dedicated to graphics pipeline 240; e.g., frame buffer 290 can be an area of memory provided by an application to graphics pipeline 240.

Vertex buffer 242 can include values of attributes for each of one or more vertices, or points specifying object(s) to be rendered. Example objects to be rendered include, but are not limited to, points, lines, shapes; e.g., triangles, groups of lines, groups of shapes, and images; e.g., textures. Example attributes of a vertex include a position of the vertex; e.g., in one dimensional (1D), two dimensional (2D), or three dimensional (3D) space, a color of the vertex, and a normal vector to the vertex. Other attributes are possible as well. In some embodiments, mobile device 210 can provide vertices and vertex attributes related to instructions for graphics processing component 720 using vertex buffer 242. In these embodiments, graphics processing component 720 can operate on the vertices once mobile device 210 instructs graphics processing component 720 to perform an instruction associated with the vertices and vertex attributes in vertex buffer 242.

Once an instruction involving vertices is started, vertices in vertex buffer 242 are provided to vertex shader 250 as vertex attributes 244. Vertex shader 250 is software provided by an application using graphics processing component 720 to customize its processing of vertices. For example, vertex shader 250 can determine a vertex's screen coordinates in 2D. FIG. 2B shows that vertex shader 250 takes vertex attributes 244 and uniform variables 246 as inputs and outputs vertex screen coordinates 252.

In some embodiments, the application can provide a shader to graphics processing component 720 by providing information about the shader. The information can be software for the shader; i.e., the application can provide the shader directly to the graphics processing component 720, a pointer or other reference to the shader; i.e., the application can provide the shader indirectly to the graphics processing component 720, and/or a combination of software for and reference(s) to components of the shader.

Along with vertices from vertex buffer 242, vertex shader can access uniform variables 246 during execution. Uniform variables are variables set by the application using graphics processing component 720 to communicate with shaders, such as vertex shader 250. Vertex shader 250 can read uniform variables to calculate the vertex's screen coordinates—for example, uniform variables specifying a point of view can be read by vertex shader 250 and used in calculating vertex screen coordinates 252. As another example, a transformation matrix that specifies an amount of object scaling; i.e., expansion or contraction, can be provided as a uniform variable to be used by vertex shader 250 in calculating vertex screen coordinates 252. Many other example calculations by vertex shader 250 and other examples of uniform variables 246 are possible as well.

In some embodiments, vertex screen coordinates 252 can have values within predetermined limits. For example, visible vertex coordinates can be provided with a ranges for a square having lower-left-corner coordinates of (−1, −1) and upper-right-corner coordinates of (+1, +1), with vertices having coordinates outside of the square not being visible. Other example screen coordinates and limits are possible as well.

Vertex screen coordinates 252 can be provided as an input to geometry shader 260 for generation of primitives 262. Primitives 262 are collection of one or more vertices defining an object to be drawn by the graphics processing component to perform the instruction. Example primitives include, but are not limited to, point primitives, line primitives, groups of lines primitives, shapes primitives; e.g., triangle primitives, and groups of shapes primitives. In some embodiments, geometry shader 260 can access uniform variables 246 to calculate primitives 246.

Geometry shader 260 can generate zero or more primitives for input vertex screen coordinates 252. Geometry shader 260 can provide multiple streams of output; e.g., by generating a primitive once and outputting the generated primitive several times, such as once per output stream. For example, if drawing multiple images using the a set of recurring shapes; e.g., shapes in the background of a scene, primitives for the recurring shapes can be calculated once by geometry shader 260 and then output to each of the multiple images.

In some embodiments not shown in the Figures, a tessellation stage of graphics pipeline 240 can be provided between vertex shader 250 and geometry shader 260. Tessellation is a process of covering a shape without gaps or overlaps by simpler figures of one type (or a few types). The tessellation stage can be used to take input vertices and generate primitives that tessellate a shape to be drawn by graphics processing component 720. If provided, the tessellation stage can output primitives that are provided as inputs to geometry shader 260. As such, if no further processing is required, such primitives provided by the tessellation stage can be output by geometry shader 260 without change.

Once primitives 262 are generated, the primitives are compared to a clipping window, or region of visibility, during clipping processing 270. A primitive within the clipping window is potentially visible in the output image and so is output as a visible primitive of visible primitives 272. Primitives outside of the clipping window are discarded during clipping processing 270.

Visible primitives 272 are then converted by rasterization processing 274 to discrete image elements, such as fragments of pixels, for drawing into frame buffer 290. Frame buffer 290 includes data for each pixel, or smallest visible picture element that is ready for display. For example, in a color display having R rows and C columns of pixels, each using Red/Green/Blue (RGB) to represent a color, frame buffer can have a red color value, a green color value, and a blue color value for each of the R*C pixels in the color display for a total of 3*R*C values: As another example, the color display can also have a depth value associated with each pixel, for a total for 4*R*C values in frame buffer 290. As such, drawing to frame buffer 290 is equivalent to drawing on the (color) display.

For a given visible primitive of visible primitives 272, rasterization processing 274 takes vertex coordinates of vertices in the visible primitive and converts the vertex coordinates to display coordinates. For example, let vertex coordinates be specified within a (−1, −1) to (+1, +1) square as discussed above, and let the display have coordinates (0,0) in the lower left hand corner to (200, 200) in the upper right hand corner. Then, example functions to convert vertex coordinates (Xvc, Yvc) to display coordinates (x, y) are: x=(Xvc+1)*100 and y=(Yvc+1)*100. Then, each pixel in frame buffer 290 within the primitive is determined, and a color for the pixel determined. The color for the pixel can be determined by blending color and other values for each vertex in the primitive. The pixels for the visible primitive can be output by rasterization processing 274 as a fragment of fragments 276.

Fragments 276 can be provided as input to fragment shader 280, which can determine a final color for pixels in the fragment. For example, fragment shader 280 can apply a texture, or overlying image, to the fragment. As another example, fragment shader 280 can simulate how light can reflect off of a material making up the fragment to determine color values for pixels in the fragment.

In some embodiments, graphics pipeline 240 can utilize and determine depth values for pixels as part of determining which aspects of a given shape are visible. For example, depth values can be determined on a per-pixel basis, where the higher the depth value associated with a given color of a pixel, the "deeper" the pixel is and the less likely the given color is to be visible. A fragment with pixel P having color CP at a depth D can be blended into a color already specified for pixel P in frame buffer 290 based on depth D and a depth of pixel P in frame buffer 290. In another example, Z-buffering can be used; i.e., if depth D for the fragment is less than the depth of pixel P in frame buffer 290, the old color and depth in frame buffer 290 for pixel P can be replaced, respectively, with color CP and depth D.

In some embodiments, fragment shader 280 can utilize and determine stencil values for pixels in an input fragment. A stencil value can used to define a rendering area—pixels with zero stencil values can be discarded and pixels with non-zero stencil values can be made available for display Stencil values can be automatically increased or decreased for every pixel that fails or passes the depth test. Combining depth and stencil values is used to create effects such as shadowing, drawing of outlines, and highlighting of primitive intersections.

In some cases, an input fragment to fragment shader 280 can be discarded; e.g., the fragment is not visible in the current image. Then, once color, depth, and perhaps stencil values are determined for each pixel in a non-discarded fragment, the non-discarded fragment can be output by fragment shader 280 as a fragment of colored and depth adjustment fragments 282.

Fragment processing 284 can apply tests to each of colored and depth adjustment fragments 282 to determine whether some or all of the pixels of the fragment are written as pixel(s) 286 to frame buffer 290. Example tests include a scissors test for only rendering pixels within a rectangular stencil window of pixels, an alpha test for testing fragments based on alpha values, stencil and depth testing as discussed immediately above, a dithering test to determine if colors of pixels are to be dithered, or randomly modified, to increase perceived color resolution, and logical-operations testing to XOR or otherwise apply a logical operation to pixels in the fragment. After applying these tests, and perhaps other processing, fragment processing 284 can generate pixels 286 that are written into frame buffer 290.

Example Graphics Processing Scenarios

Figure 3:
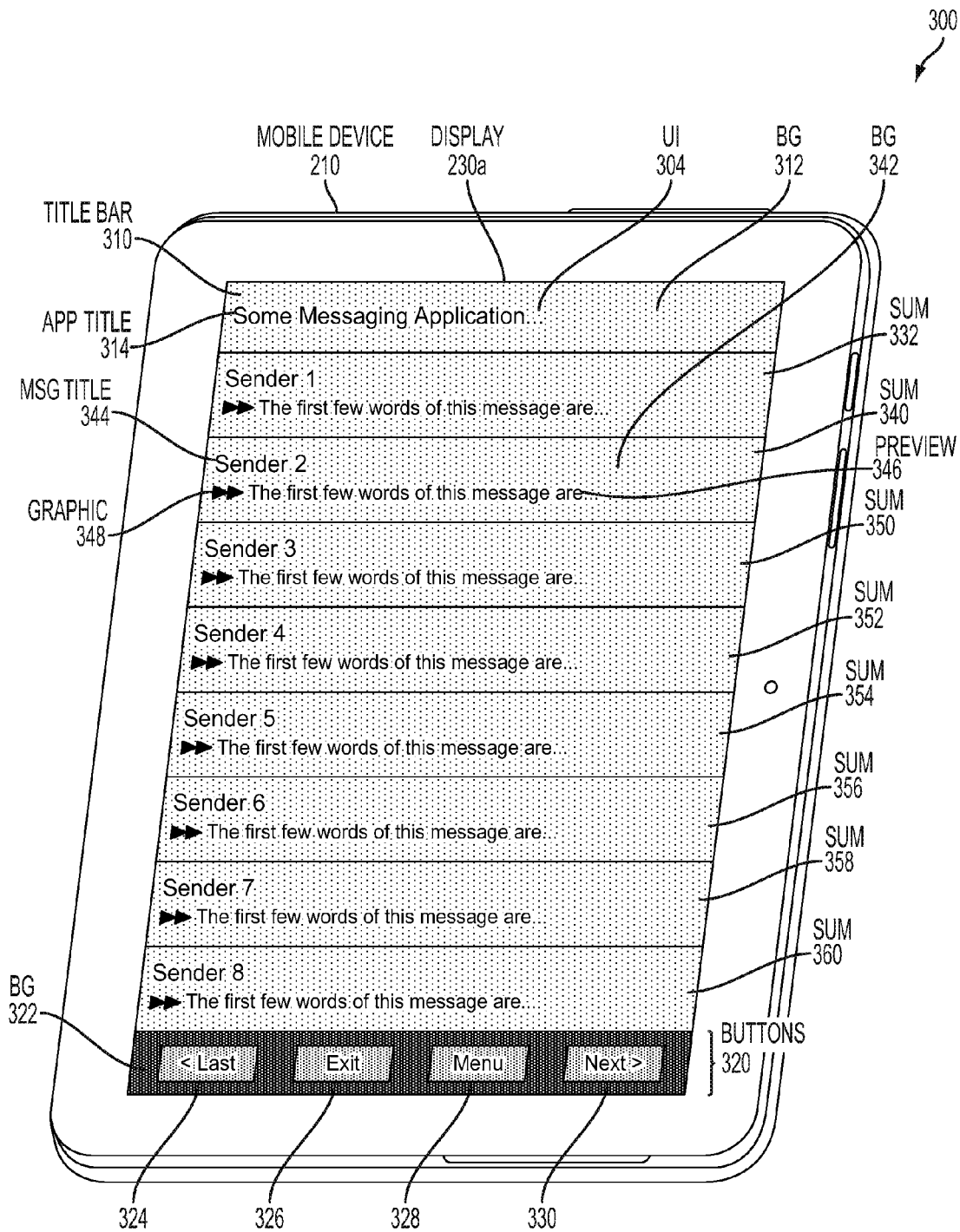
FIG. 3 shows a user interface scenario for an example messaging application, in accordance with an example embodiment.

FIG. 3 shows user interface scenario 300 for an example messaging application, in accordance with an example embodiment. Scenario 300 includes mobile device 210 utilizing user interface (UI) 304 to draw text, shapes, and images for an example messaging application. The messaging application utilizes user interface 304 to generate instructions to draw title bar 310 with background shape (BG) 312 and application title 314, buttons 320 on background shape 322, eight message summaries shown in FIG. 3 as summaries ("Sums") 332, 340, 350, 352, 354, 356, 358, and 360. Each message summary includes a background shape, a title, a preview, and a graphic. For example, FIG. 3 shows that summary 340 of a message includes background shape 342 of a dotted rectangle, title 344 of the message indicating a message sender of "Sender 2", a preview of the message 346 of "The first few words of this message are . . . ", and a graphic 348 of two adjacent black rectangles both pointing to the right.

In scenario 300, user interface 304 includes components of the messaging application shown in the first column of Table 1 below, with corresponding instructions for drawing the components in the second column of Table 1 below, and drawing VOTs corresponding to the instructions in the third column of Table 1 below.

TABLE 1

| Component | Instructions | VOTs |
|---|---|---|
| 1. Title Bar 310 | 1a. Draw background shape (BG) 312 | 1a. Shape |
|  | 1b. Draw title text (Title) 314 | 1b. Text |
| 2. Buttons 320 | 2a. Draw BG 322 | 2a. Shape |
|  | 2b. Draw image for button (Button) 324 | 2b. Image |
|  | 2c. Draw Button 326 | 2c. Image |
|  | 2d. Draw Button 328 | 2d. Image |
|  | 2e. Draw Button 330 | 2e. Image |
| 3. Summary 332 | 3a. Draw BG for 332 | 3a. Shape |
|  | 3b. Draw Title for 332 | 3b. Text |
|  | 3c. Draw preview text (Preview) for 332 | 3c. Text |
|  | 3d. Draw graphic (Graphic) for 332 | 3d. Image |
| 4. Summary 340 | 4a. Draw BG 342 | 4a. Shape |
|  | 4b. Draw Title 344 | 4b. Text |
|  | 4c. Draw Preview 346 | 4c. Text |
|  | 4d. Draw Graphic 348 | 4d. Image |
| 5. Summary 350 | 5a. Draw BG for 350 | 5a. Shape |
|  | 5b. Draw Title for 350 | 5b. Text |
|  | 5c. Draw Preview for 350 | 5c. Text |
|  | 5d. Draw Graphic for 350 | 5d. Image |
| 6. Summary 352 | 6a. Draw BG for 352 | 6a. Shape |
|  | 6b. Draw Title for 352 | 6b. Text |
|  | 6c. Draw Preview for 352 | 6c. Text |
|  | 6d. Draw Graphic for 352 | 6d. Image |
| 7. Summary 354 | 7a. Draw BG for 354 | 7a. Shape |
|  | 7b. Draw Title for 354 | 7b. Text |
|  | 7c. Draw Preview for 354 | 7c. Text |
|  | 7d. Draw Graphic for 354 | 7d. Image |
| 8. Summary 356 | 8a. Draw BG for 356 | 8a. Shape |
|  | 8b. Draw Title for 356 | 8b. Text |
|  | 8c. Draw Preview for 356 | 8c. Text |
|  | 8d. Draw Graphic for 356 | 8d. Image |
| 9. Summary 358 | 9a. Draw BG for 358 | 9a. Shape |
|  | 9b. Draw Title for 358 | 9b. Text |
|  | 9c. Draw Preview for 358 | 9c. Text |
|  | 9d. Draw Graphic for 358 | 9d. Image |

TABLE 1-continued

| Component | Instructions | VOTs |
|---|---|---|
| 10. Summary 360 | 10a. Draw BG for 360 | 10a. Shape |
| | 10b. Draw Title for 360 | 10b. Text |
| | 10c. Draw Preview for 360 | 10c. Text |
| | 10d. Draw Graphic for 360 | 10d. Image |

In scenario 300, the messaging application requests rendering of components of user interface 304 in the order shown in the first column of Table 1; that is, first title bar 310 is to be rendered, then buttons 320 are to be rendered, and then each of the eight summaries are to rendered in an order of the summaries as numbered in FIG. 3—summary 332, then summary 340, and so on to conclude with summary 360.

The second column of Table 1 indicates that, for each component of user interface 304, between two and five drawing instructions are utilized to draw the component in scenario 300. For example, Table 1 shows that two drawing instructions are used to draw title bar 310: a drawing instruction to draw a shape corresponding to background 312 and a drawing instruction to draw text corresponding to title 314. In scenario 300, the messaging application causes drawing instructions to be generated and provided to graphics processing component 720 in the order shown in the middle column of Table 1. This order includes generating and providing instruction 1a first, instruction 1b second, instruction 2a third, and so on, until instruction 10d is generated and provided to graphics processing component 720.

The third column of Table 1 shows a drawing VOT associated with each drawing instruction. For example, Table 1 shows that the drawing instruction used to draw background 312 corresponds to a "Shape" VOT 1, the drawing instruction used to draw title 314 corresponds to a "Text" VOT, and the drawing instruction used to draw an image for button 324 corresponds to an "Image" VOT.

The instructions in Table 1 can be sorted and/or merged based on similarity criteria, such as the VOT associated with each instruction, as shown in Table 2 below. Table 2 has four columns: the instructions for scenario 300 to graphics processing component 720 in the originally-presented order, the VOTs associated with the instructions to graphics processing component 720 in the same order, the instructions for scenario 300 to graphics processing component 720 sorted by VOT, and the instructions for scenario 300 to graphics processing component 720 merged by VOT.

TABLE 2

| Original Instructions | VOTs | Sorted | Merged |
|---|---|---|---|
| 1a. Draw BG 312 | 1a. Shape | Shape Instructions | 1a. Draw BG 312 |
| 1b. Draw Title 314 | 1b. Text | 1a. Draw BG 312 | 1b. Draw Title 314 |
| 2a. Draw BG 322 | 2a. Shape | 2a. Draw BG 322 | 2a. Draw BG 322 |
| 2b. Draw Button 324 | 2b. Image | 3a. Draw BG 332 | 2b-e. Draw Buttons |
| 2c. Draw Button 326 | 2c. Image | 4a. Draw BG 342 | 324, 326, 328, and 330 |
| 2d. Draw Button 328 | 2d. Image | 5a. Draw BG 350 | 3a. Draw BG 332 |
| 2e. Draw Button 330 | 2e. Image | 6a. Draw BG 352 | 3b-c. Draw Title 332 |
| 3a. Draw BG 332 | 3a. Shape | 7a. Draw BG 354 | and Preview 332 |
| 3b. Draw Title 332 | 3b. Text | 8a. Draw BG 356 | 3d. Draw Graphic 332 |
| 3c. Draw Preview 332 | 3c. Text | 9a. Draw BG 358 | 4a. Draw BG 342 |
| 3d. Draw Graphic 332 | 3d. Image | 10a. Draw BG 360 | 4b-c. Draw Title 344 |
| 4a. Draw BG 342 | 4a. Shape | Text Instructions | and Preview 346 |
| 4b. Draw Title 344 | 4b. Text | 1b. Draw Title 314 | 4d. Draw Graphic 348 |
| 4c. Draw Preview 346 | 4c. Text | 3b. Draw Title 332 | 5a. Draw BG 350 |
| 4d. Draw Graphic 348 | 4d. Image | 3c. Draw Preview 332 | 5b-c. Draw Title 350 |
| 5a. Draw BG 350 | 5a. Shape | 4b. Draw Title 344 | and Preview 350 |
| 5b. Draw Title 350 | 5b. Text | 4c. Draw Preview 346 | 5d. Draw Graphic 350 |
| 5c. Draw Preview 350 | 5c. Text | 5b. Draw Title 350 | 6a. Draw BG 352 |
| 5d. Draw Graphic 350 | 5d. Image | 5c. Draw Preview 350 | 6b-c. Draw Title 352 |
| 6a. Draw BG 352 | 6a. Shape | 6b. Draw Title 352 | and Preview 352 |
| 6b. Draw Title 352 | 6b. Text | 6c. Draw Preview 352 | 6d. Draw Graphic 352 |
| 6c. Draw Preview 352 | 6c. Text | 7b. Draw Title 354 | 7a. Draw BG 354 |
| 6d. Draw Graphic 352 | 6d. Image | 7c. Draw Preview 354 | 7b-c. Draw Title 354 |
| 7a. Draw BG 354 | 7a. Shape | 8b. Draw Title 356 | and Preview 354 |
| 7b. Draw Title 354 | 7b. Text | 8c. Draw Preview 356 | 7d. Draw Graphic 354 |
| 7c. Draw Preview 354 | 7c. Text | 9b. Draw Title 358 | 8a. Draw BG 356 |
| 7d. Draw Graphic 354 | 7d. Image | 9c. Draw Preview 358 | 8b-c. Draw Title 356 |
| 8a. Draw BG 356 | 8a. Shape | 10b. Draw Title 360 | and Preview 356 |
| 8b. Draw Title 356 | 8b. Text | 10c. Draw Preview 360 | 8d. Draw Graphic 356 |
| 8c. Draw Preview 356 | 8c. Text | Image Instructions | 9a. Draw BG 358 |
| 8d. Draw Graphic 356 | 8d. Image | 2b. Draw Button 324 | 9b-c. Draw Title 358 |
| 9a. Draw BG 358 | 9a. Shape | 2c. Draw Button 326 | and Preview 358 |
| 9b. Draw Title 358 | 9b. Text | 2d. Draw Button 328 | 9d. Draw Graphic 358 |
| 9c. Draw Preview 358 | 9c. Text | 2e. Draw Button 330 | 10a. Draw BG 360 |
| 9d. Draw Graphic 358 | 9d. Image | 3d. Draw Graphic 332 | 10b-c. Draw Title 360 |
| 10a. Draw BG 360 | 10a. Shape | 4d. Draw Graphic 348 | and Preview 360 |
| 10b. Draw Title 360 | 10b. Text | 5d. Draw Graphic 350 | 10d. Draw Graphic 360 |
| 10c. Draw Preview 360 | 10c. Text | 6d. Draw Graphic 352 | |
| 10d. Draw Graphic 360 | 10d. Image | 7d. Draw Graphic 354 | |
| | | 8d. Draw Graphic 356 | |
| | | 9d. Draw Graphic 358 | |
| | | 10d. Draw Graphic 360 | |

The instructions for scenario 300 to graphics processing component 720 and the VOTs associated with the instructions to graphics processing component 720 are copied from Table 1 to increase the readability of Table 2.

The instructions for scenario 300 to graphics processing component 720 are sorted by similarity criteria taking overlap and state into account, such as discussed above in detail in the context of FIGS. 2A and 2B. In scenario 300, the only overlapping involves drawing text and images on top of background shapes. Overlap can then be considered by drawing all of the background shapes first, as shown in both the sorted and merged instructions above. Also, in scenario 300, no state instructions are provided by mobile device 210 to graphics processing component 720 for displaying components of user interface 304 as shown in FIG. 3.

By sorting instructions by VOT, the number of instructions that operate on the same type of visible object can be increased. In some embodiments, shaders are provided to graphics pipeline 740 based on the VOT; e.g., one or more shaders can be provided to render text/perform instructions associated with a text VOT, while other shader(s) can be provided to render images/perform instructions associated with image and/or shape VOTs. In these embodiments, by sorting instructions by VOT, shaders can be provided for a first instruction associated with a given VOT and then reused by each immediately subsequent instruction that is associated with the same VOT as the given VOT. As mentioned above, other similarity criteria can be used as well to sort and/or merge instructions.

The reuse of shaders can decrease time and resources utilized by graphics pipeline 740 by eliminating the time and resources used to switch now-reused shaders. Merging instructions can decrease time and resources utilized by graphics pipeline 740 by eliminating the time and resources used to perform per-instruction processing for each of the now-merged instructions.

The first column of Table 2 indicates that 39 instructions are originally provided to graphics processing component 720. In the original order of instructions, the 39 instructions change VOTs 24 times between instructions. For example, instruction 1a in the first column of Table 2 has a VOT of "shape" as shown in the corresponding entry of the second column of Table 2 and instruction 1b has a VOT of "text". Thus, between instruction 1a and instruction 1b, the VOT has changed from a shape VOT to a text VOT. The third column of Table 2 shows that, after sorting, the VOT only changes three times: the initial VOT of "shape", then after performing instruction 10a, the corresponding VOT changes to "text" for instruction 1b, and after performing instruction 10c, the corresponding VOT changes to "image" for instruction 2b.

Figure 4A:
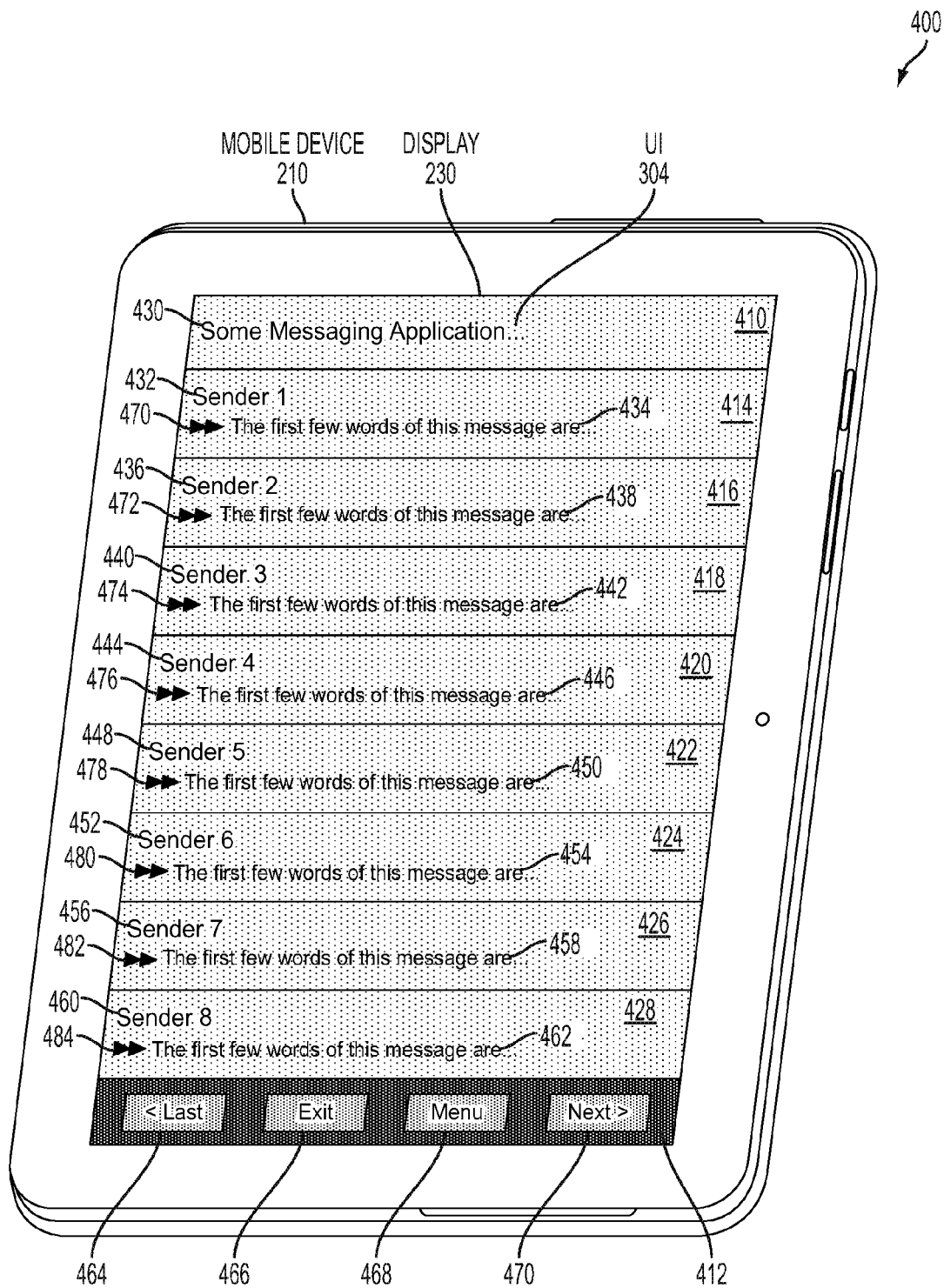
FIG. 4A shows another user interface scenario for the example messaging application, in accordance with an example embodiment.

FIG. 4A shows user interface scenario 400 for the example messaging application, in accordance with an example embodiment. In user interface scenario 400, the original instructions for components of user interface 304 are first sorted by mobile device 210 and then provided to graphics processing component 720 for performance and display on display 230. In FIG. 4A each components of user interface 304 is numbered according to rendering or drawing order based on the sorted instructions shown in Table 2. That is, background 410 is rendered (drawn) first in accord with instruction 1a, then background 412 is rendered, and so on until texture 484 is rendered in accord with instruction 10d.

The fourth column of Table 2 shows that the number of instructions by merging adjacent instructions based on the similarity criteria of having the same VOT is reduced from 39 total instructions as originally presented to 28 instructions.

In some embodiments, instructions can be both sorted and merged. For example, Table 3 below has three columns: the original instructions and sorted instructions shown in Table 2 above, and a "Sorted, the Merged" column showing a result of sorting and the merging the original instructions for scenario 300.

TABLE 3

| Original Instructions | Sorted | Sorted, then Merged |
|---|---|---|
| 1a. Draw BG 312 | Shapes | 1. Draw BG 312, BG 322, |
| 1b. Draw Title 314 | 1a. Draw BG 312 | BG 332, BG 342, BG 350, |
| 2a. Draw BG 322 | 2a. Draw BG 322 | BG 352, BG 354, BG 356, |
| 2b. Draw Button 324 | 3a. Draw BG 332 | BG 358, and BG 360 |
| 2c. Draw Button 326 | 4a. Draw BG 342 | 2. Draw Title 314, Title 332, |
| 2d. Draw Button 328 | 5a. Draw BG 350 | Preview 332, Title 344, |
| 2e. Draw Button 330 | 6a. Draw BG 352 | Preview 346, Title 350, |
| 3a. Draw BG 332 | 7a. Draw BG 354 | Preview 350, Title 352, |
| 3b. Draw Title 332 | 8a. Draw BG 356 | Preview 352, Title 354, |
| 3c. Draw Preview 332 | 9a. Draw BG 358 | Preview 354, Title 356, |
| 3d. Draw Graphic 332 | 10a. Draw BG 360 | Preview 356, Title 358, |
| 4a. Draw BG 342 | Text | Preview 358, Title 360, and |
| 4b. Draw Title 344 | 1b. Draw Title 314 | Preview 360. |
| 4c. Draw Preview 346 | 3b. Draw Title 332 | 3. Draw Button 324, Button |
| 4d. Draw Graphic 348 | 3c. Draw Preview 332 | 326, Button 328, Button 330, |
| 5a. Draw BG 350 | 4b. Draw Title 344 | Graphic 332, Graphic 348, |
| 5b. Draw Title 350 | 4c. Draw Preview 346 | Graphic 350, Graphic 352, |
| 5c. Draw Preview 350 | 5b. Draw Title 350 | Graphic 354, Graphic 356, |
| 5d. Draw Graphic 350 | 5c. Draw Preview 350 | Graphic 358, and Graphic |
| 6a. Draw BG 352 | 6b. Draw Title 352 | 360. |
| 6b. Draw Title 352 | 6c. Draw Preview 352 | |
| 6c. Draw Preview 352 | 7b. Draw Title 354 | |
| 6d. Draw Graphic 352 | 7c. Draw Preview 354 | |
| 7a. Draw BG 354 | 8b. Draw Title 356 | |
| 7b. Draw Title 354 | 8c. Draw Preview 356 | |
| 7c. Draw Preview 354 | 9b. Draw Title 358 | |
| 7d. Draw Graphic 354 | 9c. Draw Preview 358 | |
| 8a. Draw BG 356 | 10b. Draw Title 360 | |
| 8b. Draw Title 356 | 10c. Draw Preview 360 | |
| 8c. Draw Preview 356 | Images | |
| 8d. Draw Graphic 356 | 2b. Draw Button 324 | |

TABLE 3-continued

| Original Instructions | Sorted | Sorted, then Merged |
|---|---|---|
| 9a. Draw BG 358 | 2c. Draw Button 326 | |
| 9b. Draw Title 358 | 2d. Draw Button 328 | |
| 9c. Draw Preview 358 | 2e. Draw Button 330 | |
| 9d. Draw Graphic 358 | 3d. Draw Graphic 332 | |
| 10a. Draw BG 360 | 4d. Draw Graphic 348 | |
| 10b. Draw Title 360 | 5d. Draw Graphic 350 | |
| 10c. Draw Preview 360 | 6d. Draw Graphic 352 | |
| 10d. Draw Graphic 360 | 7d. Draw Graphic 354 | |
| | 8d. Draw Graphic 356 | |
| | 9d. Draw Graphic 358 | |
| | 10d. Draw Graphic 360 | |

Table 3 shows the three resulting instructions after sorting and then merging the original 39 instructions of scenario 300. The three resulting instructions take overlap and state into account, while reducing overhead for 24 instruction changes and 39 instructions to the overhead for three instruction changes and three instructions.

Figure 4B:
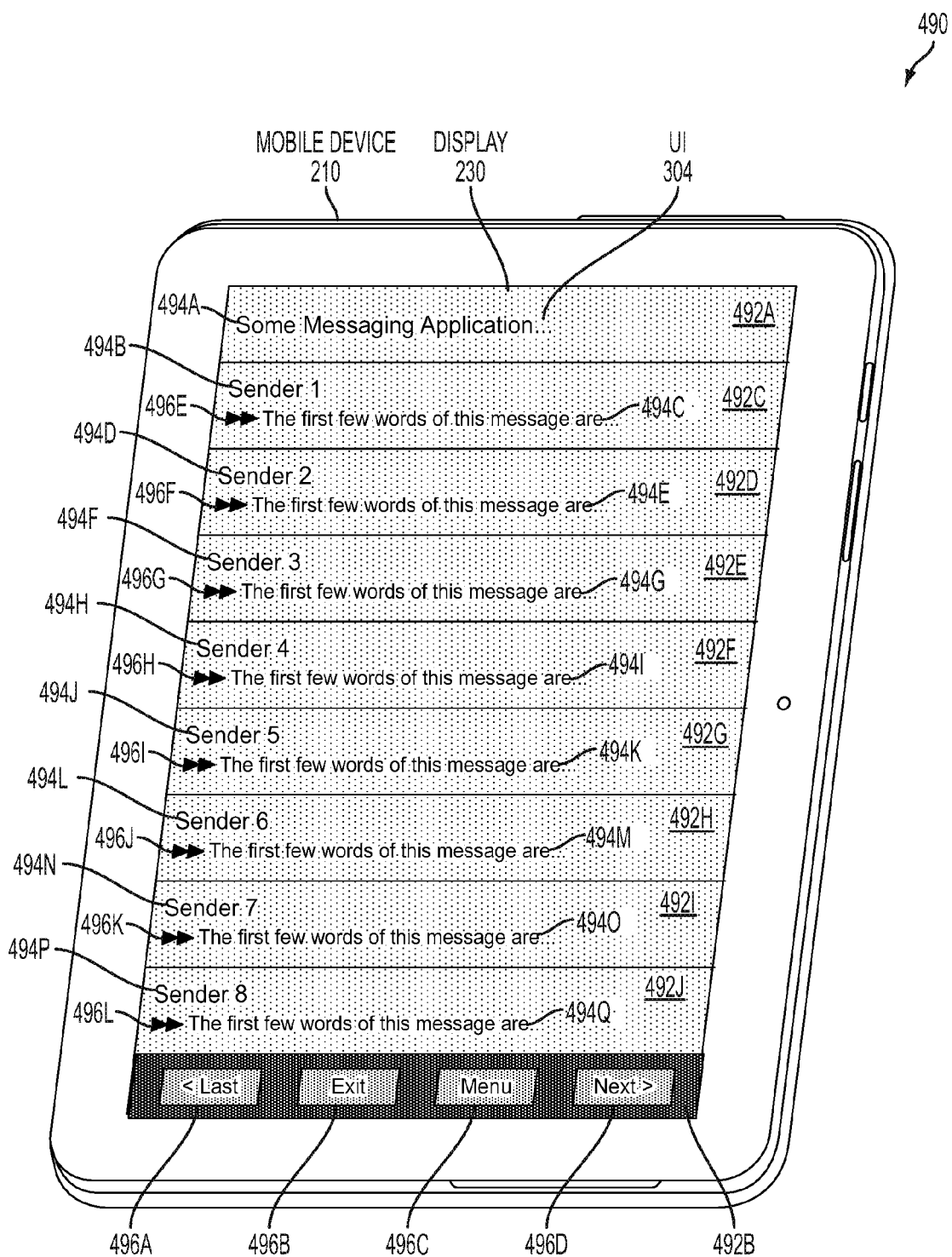
FIG. 4B shows yet another user interface scenario for the example messaging application, in accordance with an example embodiment.

FIG. 4B shows user interface scenario 490 for the example messaging application, in accordance with an example embodiment. In user interface scenario 490, the original instructions for components of user interface 304 are first sorted and then merged by mobile device 210. The sorted and merged instructions, shown above in the third column of Table 3, are provided to graphics processing component 720 for performance and display on display 230.

In FIG. 4B, each component of user interface 304 is numbered and lettered according to rendering order based on the sorted and merged instructions. Each of the three sorted and merged instructions is shown with a separate number: components rendered by instruction 1 of the "Sorted, then Merged"/third column of table 3 are labeled with the number 492 followed by a letter indicating the order the component is listed within instruction 1, components rendered by instruction 2 of the "Sorted, then Merged"/third column of table 3 are labeled with the number 494 followed by a letter indicating the order the component is listed within instruction 2, and components rendered by instruction 3 of the "Sorted, then Merged"/third column of table 3 are labeled with the number 496 followed by a letter indicating the order the component is listed within instruction 3. For example, title 494J is performed by instruction 2 of the third column of Table 3 and is the 10$^{th}$ component listed within instruction 2 (corresponding to the ordinal position of letter J within the alphabet) or "Title [for original summary] 354 [as numbered in FIG. 3]".

The reordering and/or merging of graphics processing component instructions can be performed without changing the software in the messaging application or changing appearance or performance of user interface 304. As shown in the examples above, 39 instructions used to draw user interface 304 can be reduced to as few as 3 instructions. Thus, the performance of user interface 304 can be improved, in some cases substantially improved, without changing the software of user interface 304.

Figure 5:
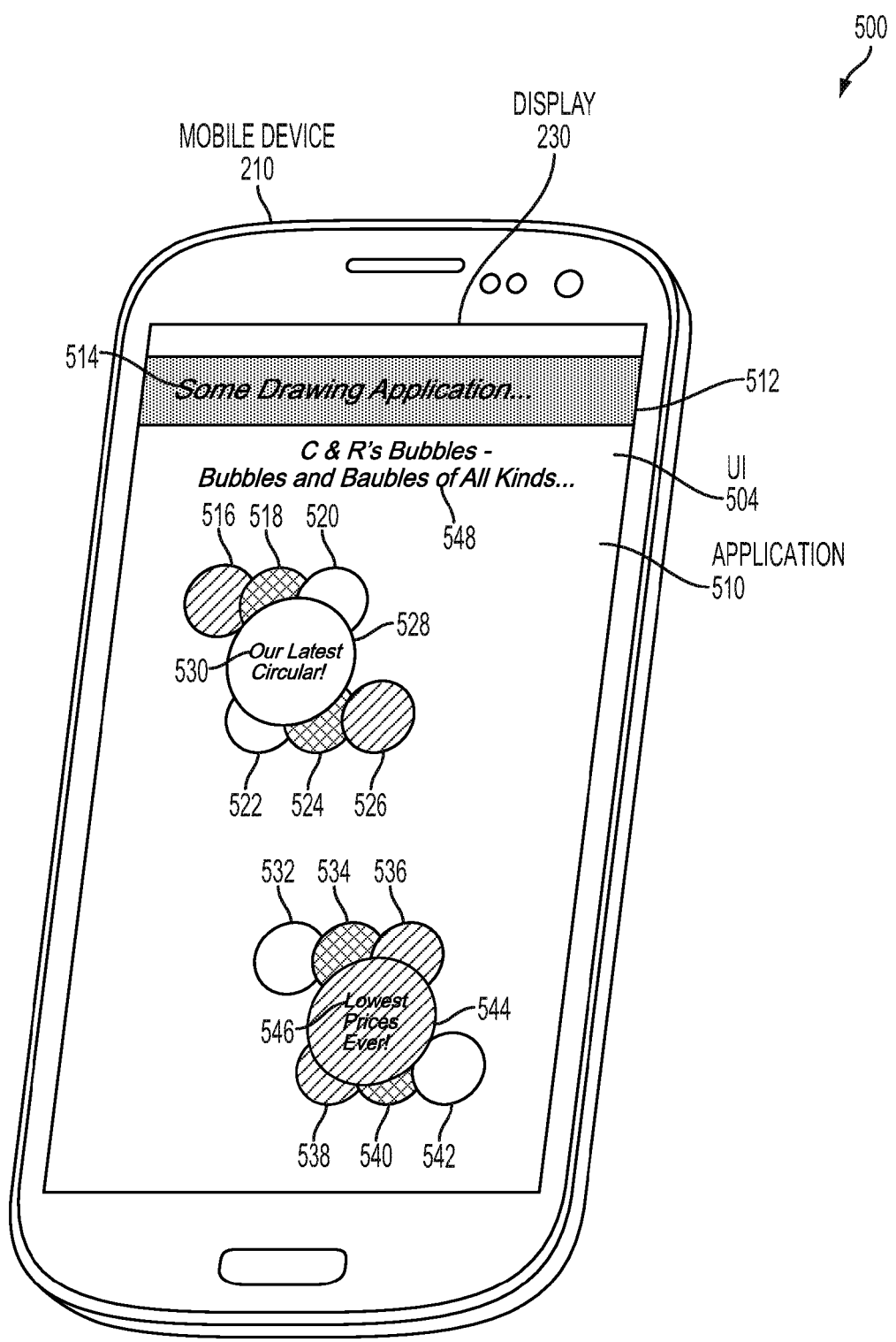
FIG. 5 shows a user interface scenario for an example drawing application, in accordance with an example embodiment.

FIG. 5 shows user interface scenario 500 for an example drawing application 510, in accordance with an example embodiment. User interface 504 of drawing application 510 includes a title bar background 512 of a rectangle with a dotted background, title bar text 514 of "Some Drawing Application . . . ", and a drawing region. The drawing region shows circles 516, 518, 502, 522, 524, 526, 528, 532, 534, 536, 538, 540, 542, and 544 of having various background textures, text 530 of "Our Latest Circular!", text 546 of "Lowest Prices Ever!", and text 548 of "C & R's Baubles—Bubbles and Baubles of All Kinds . . . ".

As shown in FIG. 5, text 514 overlaps title bar background 512, circle 518 overlaps circle 516, circle 520 overlaps circle 518, circle 524 overlaps circle 522, circle 526 overlaps circle 524, circle 528 overlaps circles 518, 520, 522, and 524, and text 530 overlaps circle 528. FIG. 5 also shows that circle 534 overlaps circle 532, circle 536 overlaps circle 534, circle 540 overlaps circle 538, circle 542 overlaps circle 540, circle 544 overlaps circles 534, 536, 538, 540, and 542, and text 546 overlaps circle 544.

TABLE 4

| Instructions | VOTs | Sorted | Sorted, then Merged |
|---|---|---|---|
| 1. Draw BG 512 | 1. Shape | 1. Draw BG 512 | 1. Draw BG 512, Circle 516, Circle 522, Circle 532, Circle 538 |
| 2. Draw Title 514 | 2. Text | 2. Draw Circle 516 | |
| 3. Draw Circle 516 | 3. Shape | 3. Draw Circle 532 | 2. Draw Title 514, Text 548 |
| 4. Draw Circle 518 | 4. Shape | 4. Draw Title 514 | 3. Draw Circle 518, Circle 524, Circle 534, Circle 540 |
| 5. Draw Circle 520 | 5. Shape | 5. Draw Text 548 | |
| 6. Draw Circle 522 | 6. Shape | 6. Draw Circle 518 | 4. Draw Circle 520, Circle 526, Circle 536, Circle 542 |
| 7. Draw Circle 524 | 7. Shape | 7. Draw Circle 534 | |
| 8. Draw Circle 526 | 8. Shape | 8. Draw Circle 520 | 5. Draw Circle 528, Circle 544 |
| 9. Draw Circle 528 | 9. Shape | 9. Draw Circle 536 | 6. Draw Text 530, Text 546 |
| 10. Draw Text 530 | 10. Text | 10. Draw Circle 522 | |
| 11. Draw Circle 532 | 11. Shape | 11. Draw Circle 538 | |
| 12. Draw Circle 534 | 12. Shape | 12. Draw Circle 524 | |
| 13. Draw Circle 536 | 13. Shape | 13. Draw Circle 540 | |
| 14. Draw Circle 538 | 14. Shape | 14. Draw Circle 526 | |
| 15. Draw Circle 540 | 15. Shape | 15. Draw Circle 542 | |
| 16. Draw Circle 542 | 16. Shape | 16. Draw Circle 528 | |
| 17. Draw Circle 544 | 17. Shape | 17. Draw Circle 544 | |
| 18. Draw Text 546 | 18. Text | 18. Draw Text 530 | |
| 19. Draw Text 548 | 19. Text | 19. Draw Text 546 | |

Table 4 includes four columns: the first column shows example commands to graphics processing unit 720 for displaying the image presented by user interface 504 of drawing application 510, the second column shows each VOT associated with the corresponding instruction in the first column, the third column shows the instructions of the first column after being sorted by the similarity criteria of VOT while taking state and overlap into account, and the fourth column shows the instructions of the first column after being sorted and merged while taking state and overlap into account.

During sorting, a draw circle 518 instruction can be determined to overlap a draw circle 516 instruction. Then, to preserve correctness of the image presented by user interface 504, the draw circle 518 instruction should take place after the draw circle 518 instruction. Further, as in some embodiments, the order of merged instructions can be indeterminate, the draw circle 516 instruction and the draw circle 518 instruction should remain separate; i.e., not merged. Similarly, the other overlapping circles and text noted above indicates that fewer instructions can be merged due to overlap considerations.

The first column of Table 4 shows 19 example instructions to graphics processing component 720 for drawing components of user interface 504 shown in FIG. 5. The 19 commands include five VOT changes: a change from a shape VOT to a text VOT between instructions 1 and 2, a change from a text VOT to a shape VOT between instructions 2 and 3, a change from a shape VOT to a text VOT between instructions 9 and 10, a change from a text VOT to a shape VOT between instructions 10 and 11, and a change from a shape VOT to a text VOT between instructions 17 and 18. After sorting, only three VOT changes occur: a change from a shape VOT to a text VOT between sorted instructions 3 and 4, a change from a text VOT to a shape VOT between sorted instructions 5 and 6, and a change from a shape VOT to a text VOT between instructions 17 and 18.

After sorting and merging the example instructions to graphics processing component 720 for drawing components of user interface 504, the fourth column shows a total of six resulting instructions with three changes in VOT, leading to a net reduction of thirteen instructions and two changes in VOT. Therefore, even when provided with instructions for an image with a relatively large number of overlapping components, such as the image of user interface 504 shown in FIG. 5, 13 of the original 19 instructions and two of the original five changes in VOT can be eliminated, saving about one-half of the overhead required for instructions and changes in VOT. By sorting and merging of GUI commands, overhead can be reduced by almost one-half even for images where significant overhead reduction may not be expected due to features of the image being rendered.

Example Data Network

Figure 6:
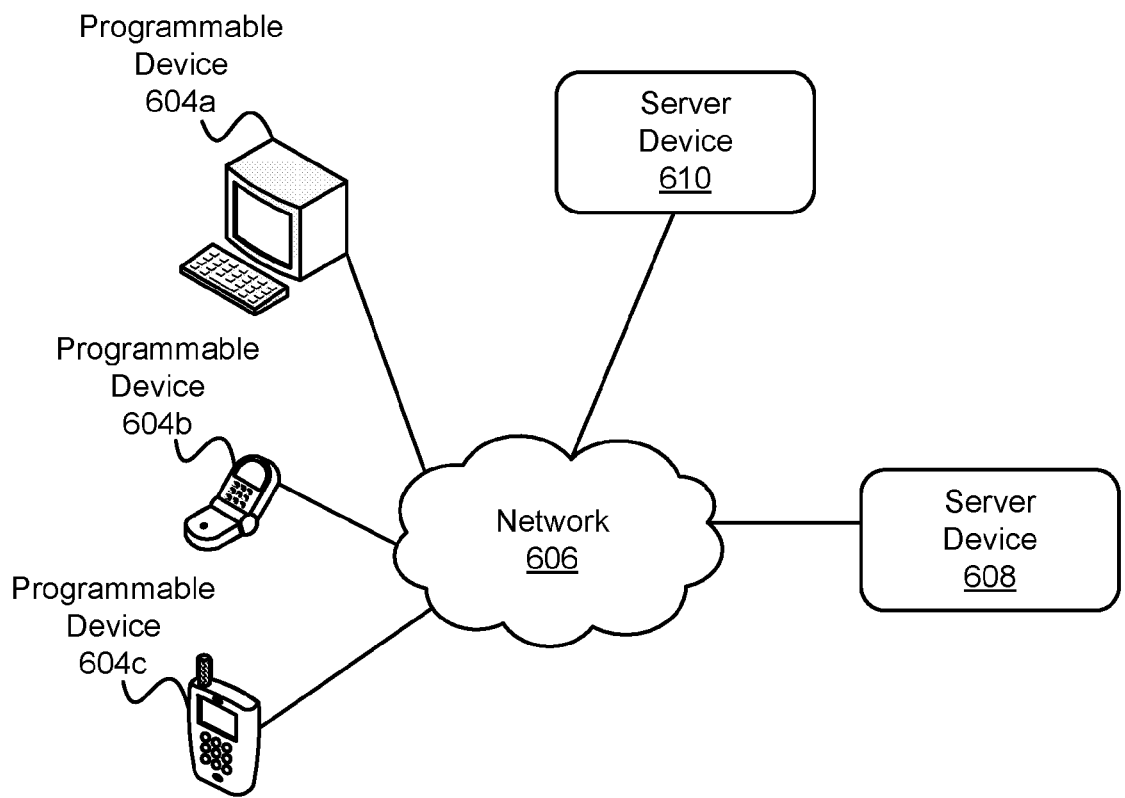
FIG. 6 depicts a distributed computing architecture, in accordance with an example embodiment.

FIG. 6 shows server devices 608, 610 configured to communicate, via network 606, with programmable devices 604a, 604b, and 604c. Network 606 may correspond to a LAN, a wide area network (WAN), a corporate intranet, the public Internet, or any other type of network configured to provide a communications path between networked computing devices. The network 606 may also correspond to a combination of one or more LANs, WANs, corporate intranets, and/or the public Internet.

Although FIG. 6 only shows three programmable devices, distributed application architectures may serve tens, hundreds, or thousands of programmable devices. Moreover, programmable devices 604a, 604b, and 604c (or any additional programmable devices) may be any sort of computing device, such as an ordinary laptop computer, desktop computer, network terminal, wireless communication device (e.g., a cell phone or smart phone), and so on. In some embodiments, programmable devices 604a, 604b, and 604c may be dedicated to the design and use of software applications. In other embodiments, programmable devices 604a, 604b, and 604c may be general purpose computers that are configured to perform a number of tasks and need not be dedicated to software development tools.

Server devices 608, 610 can be configured to perform one or more services, as requested by programmable devices 604a, 604b, and/or 604c. For example, server device 608 and/or 610 can provide content to programmable devices 604a-604c. The content can include, but is not limited to, web pages, hypertext, scripts, binary data such as compiled software, images, audio, and/or video.

The content can include compressed and/or uncompressed content. The content can be encrypted and/or unencrypted. Other types of content are possible as well.

As another example, server device 608 and/or 610 can provide programmable devices 604a-604c with access to software for database, search, computation, graphical, audio, video, World Wide Web/Internet utilization, and/or other functions. Many other examples of server devices are possible as well.

Computing Device Architecture

Figure 7A:
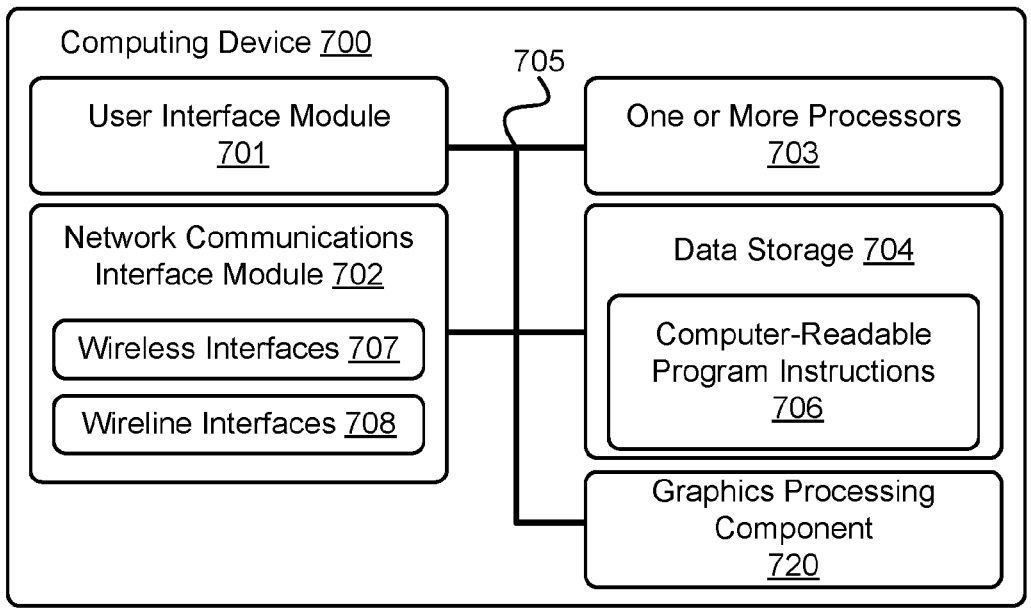
FIG. 7A is a block diagram of a computing device, in accordance with an example embodiment.

FIG. 7A is a block diagram of a computing device (e.g., system) in accordance with an example embodiment. In particular, computing device 700 shown in FIG. 7A can be configured to perform one or more functions of mobile device 210, server devices 608, 610, network 606, and/or one or more programmable devices 604a, 604b, and 604c. Computing device 700 may include a user interface module 701, a network-communication interface module 702, one or more processors 703, data storage 704, and graphics processing component 720, all of which may be linked together via a system bus, network, or other connection mechanism 705.

User interface module 701 can be operable to send data to and/or receive data from external user input/output devices. For example, user interface module 701 can be configured to send and/or receive data to and/or from user input devices such as a keyboard, a keypad, a touch screen, a computer mouse, a track ball, a joystick, a camera, a voice recognition module, and/or other similar devices. User interface module 701 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. For example, in some embodiments, user interface module 701 can include one or more canvases for providing and/or displaying visible output, such as but not limited to, canvas 230, display 230, 230a, and/or frame buffer 290. User interface module 701 can also be configured to generate audible output(s), such as a speaker, speaker jack, audio output port, audio output device, earphones, and/or other similar devices.

Network-communications interface module 702 can include one or more wireless interfaces 707 and/or one or more wireline interfaces 708 that are configurable to communicate via a network, such as network 606 shown in FIG. 6. Wireless interfaces 707 can include one or more wireless transmitters, receivers, and/or transceivers, such as a Bluetooth® transceiver, a Zigbee® transceiver, a Wi-Fi® transceiver, a WiMAX™ transceiver, and/or other similar type of wireless transceiver configurable to communicate via a wireless network. Wireline interfaces 708 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 702 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 703 can include one or more general purpose processors and/or one or more special purpose processors (e.g., digital signal processors, application specific integrated circuits, etc.). Processors 703 can be configured to execute computer-readable program instructions 706a that are contained in the data storage 704 and/or other instructions as described herein.

Data storage 704 can include one or more computer-readable storage media that can be read and/or accessed by at least one of processors 703. The one or more computer-readable storage media can include volatile and/or non-volatile storage components, such as optical, magnetic, organic or other memory or disc storage, which can be integrated in whole or in part with at least one of processors 703. In some embodiments, data storage 704 can be implemented using a single physical device (e.g., one optical, magnetic, organic or other memory or disc storage unit), while in other embodiments, data storage 704 can be implemented using two or more physical devices. The one or more computer-readable storage media can be, or can include, one or more non-transitory computer-readable storage media.

Data storage 704 can include computer-readable program instructions 706 and perhaps additional data, such as but not limited to data used by one or more processes and/or threads of a software application. In some embodiments, data storage 704 can additionally include storage required to perform at least part of the herein-described methods and techniques and/or at least part of the functionality of the herein-described devices and networks.

Graphics processing component 720 can be, and or include, hardware, firmware, and/or software configured to perform some or all of the tasks used in rendering imagery, perhaps for display using a user display device of user interface module 701. For example, graphics processing component 720 can include, but is not limited to, one or more graphics processing units (GPUs), graphics co-processors, graphics pipelines, frame buffers, graphics libraries, graphics software, computer-readable memories (including non-transitory computer-readable memories) partially or entirely dedicated for graphics operations, and rendering engines. For example, in some embodiments, graphics processing component 720 can include graphics pipeline 240 and, perhaps frame buffer 290. In some embodiments, part or all of the functionality of graphics processing component 720 can be performed by user interface module 701, processors 703, data storage 704, and/or instructions 706.

Cloud-Based Servers

Figure 7B:
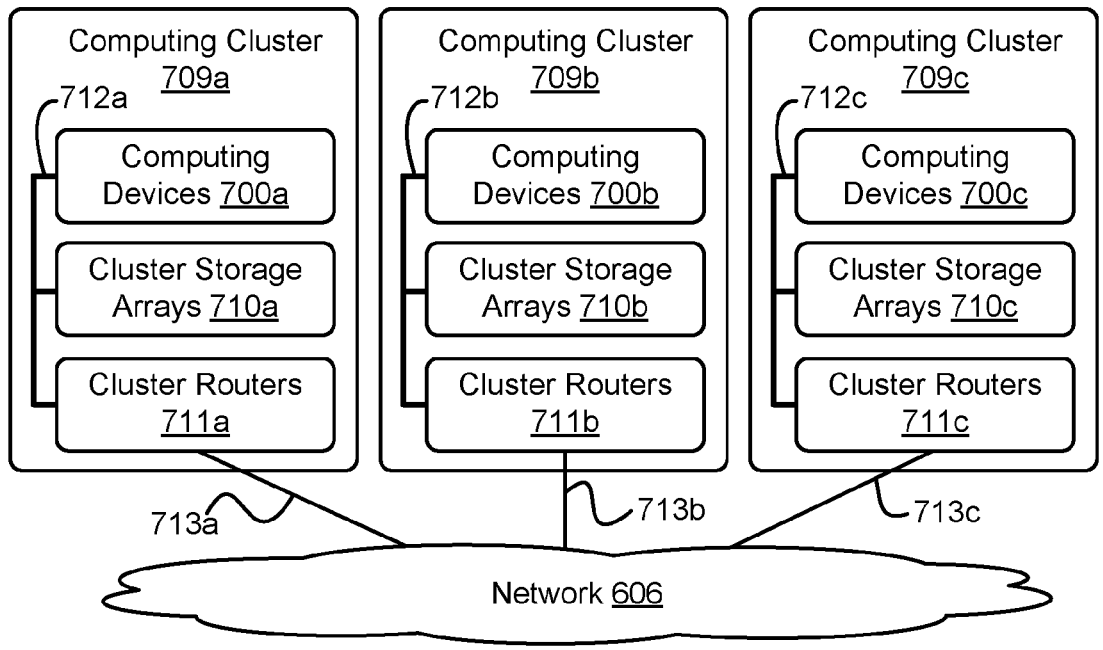
FIG. 7B depicts a cloud-based server system, in accordance with an example embodiment.

FIG. 7B depicts a network 606 of computing clusters 709a, 709b, 709c arranged as a cloud-based server system in accordance with an example embodiment. Server devices 608 and/or 610 can be cloud-based devices that store program logic and/or data of cloud-based applications and/or services. In some embodiments, server devices 608 and/or 610 can be a single computing device residing in a single computing center. In other embodiments, server device 608 and/or 610 can include multiple computing devices in a single computing center, or even multiple computing devices located in multiple computing centers located in diverse geographic locations. For example, FIG. 6 depicts each of server devices 608 and 610 residing in different physical locations.

In some embodiments, data and services at server devices 608 and/or 610 can be encoded as computer readable information stored in non-transitory, tangible computer readable media (or computer readable storage media) and accessible by programmable devices 604a, 604b, and 604c, and/or other computing devices. In some embodiments, data at server device 608 and/or 610 can be stored on a single disk drive or other tangible storage media, or can be implemented on multiple disk drives or other tangible storage media located at one or more diverse geographic locations.

FIG. 7B depicts a cloud-based server system in accordance with an example embodiment. In FIG. 7B, the functions of server device 608 and/or 610 can be distributed among three computing clusters 709a, 709b, and 708c. Computing cluster 709a can include one or more computing devices 700a, cluster storage arrays 710a, and cluster routers 711a connected by a local cluster network 712a. Similarly, computing cluster 709b can include one or more computing devices 700b, cluster storage arrays 710b, and cluster routers 711b connected by a local cluster network 712b. Likewise, computing cluster 709c can include one or more computing devices 700c, cluster storage arrays 710c, and cluster routers 711c connected by a local cluster network 712c.

In some embodiments, each of the computing clusters 709a, 709b, and 709c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 709a, for example, computing devices 700a can be configured to perform various computing tasks of server 608. In one embodiment, the various functionalities of server 608 can be distributed among one or more computing devices 700a, 700b, and 700c. Computing devices 700b and 700c in computing clusters 709b and 709c can be configured similarly to computing devices 700a in computing cluster 709a. On the other hand, in some embodiments, computing devices 700a, 700b, and 700c can be configured to perform different functions.

In some embodiments, computing tasks and stored data associated with server devices 608 and/or 610 can be distributed across computing devices 700a, 700b, and 700c based at least in part on the processing requirements of server devices 608 and/or 610, the processing capabilities of computing devices 700a, 700b, and 700c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 710a, 710b, and 710c of the computing clusters 709a, 709b, and 709c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 608 and/or 610 can be distributed across computing devices 700a, 700b, and 700c of computing clusters 709a, 709b, and 709c, various active portions and/or backup portions of these components can be distributed across cluster storage arrays 710a, 710b, and 710c. For example, some cluster storage arrays can be configured to store the data of server device 608, while other cluster storage arrays can store data of server device 610. Additionally, some cluster storage arrays can be configured to store backup versions of data stored in other cluster storage arrays.

The cluster routers 711a, 711b, and 711c in computing clusters 709a, 709b, and 709c can include networking equipment configured to provide internal and external communications for the computing clusters. For example, the cluster routers 711a in computing cluster 709a can include one or more internet switching and routing devices configured to provide (i) local area network communications between the computing devices 700a and the cluster storage arrays 701a via the local cluster network 712a, and (ii) wide area network communications between the computing cluster 709a and the computing clusters 709b and 709c via the wide area network connection 713a to network 606. Cluster routers 711b and 711c can include network equipment similar to the cluster routers 711a, and cluster routers 711b and 711c can perform similar networking functions for computing clusters 709b and 709b that cluster routers 711a perform for computing cluster 709a.

In some embodiments, the configuration of the cluster routers 711a, 711b, and 711c can be based at least in part on the data communication requirements of the computing devices and cluster storage arrays, the data communications capabilities of the network equipment in the cluster routers 711a, 711b, and 711c, the latency and throughput of local networks 712a, 712b, 712c, the latency, throughput, and cost of wide area network links 713a, 713b, and 713c, and/or other factors that can contribute to the cost, speed, fault-tolerance, resiliency, efficiency and/or other design goals of the moderation system architecture.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
receiving, at a computing device, a plurality of instructions for a graphics processing component of the computing device, wherein the graphics processing component is associated with a plurality of shaders, wherein the plurality of instructions comprise a first instruction associated with a first group of shaders selected from the plurality of shaders and a second instruction associated with a second group of shaders selected from the plurality of shaders, and wherein each instruction of the plurality of instructions are associated with at least a portion of a canvas;

determining a sorted plurality of instructions by at least sorting the plurality of instructions so that the first instruction is sorted into a first group of instructions associated with the first group of shaders and the second instruction is sorted into a second group of instructions associated with the second group of shaders, wherein the first group of shaders differ from the second group of shaders, wherein the sorted plurality of instructions are sorted for similarity while preserving a drawing ordering of the plurality of instructions, and wherein sorting the plurality of instructions comprises:

determining a first portion of the canvas associated with the first instruction, determining an insertion position in an instruction buffer for the first instruction by at least:

determining a second instruction in the instruction buffer, determining a second portion of the canvas associated with the second instruction in the instruction buffer, and if the second portion overlaps the first portion, then determining the insertion position based on an overlapping-instruction position, wherein the overlapping-instruction position is based on a position in the instruction buffer of the second instruction in the instruction buffer;

determining one or more merged instructions by at least merging the sorted plurality of instructions; and providing the one or more merged instructions to the graphics processing component, wherein the graphics processing component performs the one or more merged instructions.

2. The method of claim 1, wherein the sorted plurality of instructions are sorted for similarity based on a similarity of visible object types of the plurality of instructions.

3. The method of claim 1, wherein sorting the plurality of instructions comprises:

determining whether the first instruction is similar to the second instruction based on the first and second groups of shaders; and after determining that the first instruction is similar to the second instruction, determining an insertion position in an instruction buffer based on a second position, wherein the second position is based on the position in the instruction buffer of the second instruction in the instruction buffer.

4. The method of claim 3, wherein determining whether the first instruction is similar to the second instruction based on the first and second groups of shaders comprises determining that the first instruction is similar to the second instruction when the first group of the one or more shaders is the same as the second group of shaders.

5. The method of claim 3, wherein the instruction buffer has a beginning position that begins the instruction buffer and an ending position ends the instruction buffer, wherein the instruction buffer stores at least one instruction, and wherein determining the insertion position comprises:

setting a search position to an initial search position that is based on the ending position;

determining a third instruction at the search position in the instruction buffer;

determining a third portion of the canvas associated with the third instruction at the search position of the instruction buffer;

determining whether the third portion overlaps the first portion;

after determining that the third portion overlaps the first portion, determining that the overlapping-instruction position is the search position; and otherwise:
determining that the third portion does not overlap the first portion,
determining whether the third instruction at the search position of the instruction buffer is similar to the first instruction,
after determining that the third instruction at the search position of the instruction buffer is identified as being similar to the first instruction, then determining that the second position is the search position, and
otherwise:
determining that the third portion does not overlap the first portion and that the third instruction at the search position of the instruction buffer is not similar to the first instruction, and
decrementing the search position.

6. The method of claim 5, further comprising:

after decrementing the search position, determining whether the search position is before the beginning position; and after determining that the search position is before the beginning position:
determining a position of a most-similar instruction, wherein the most-similar instruction is an instruction that is closest in similarity to an instruction that has been searched in the instruction buffer, and
determining that the insertion position is based on the position of the most-similar instruction.

7. The method of claim 1, wherein merging the sorted plurality of instructions comprises:

determining a first plurality of consecutive instructions of the sorted plurality of instructions, wherein each instruction of the first plurality of consecutive instructions is associated with a third group of shaders; and determining a first merged instruction of the one or more merged instructions by at least merging the first plurality of consecutive instructions into the first merged instructions.

8. The method of claim 1, wherein the sorted plurality of instructions are stored in an instruction buffer, and wherein merging the sorted plurality of instructions comprises:

determining a first state of the graphics processing component, wherein the first state is represented by a first matrix;

associating the first state with a first sorted instruction of the sorted plurality of instructions;

searching an instruction buffer to identify a mergeable instruction for the first sorted instruction, wherein the mergeable instruction is stored at a mergeable location in the instruction buffer, and wherein the mergeable instruction is associated with a second state of the graphics processing component, and wherein the second state is represented by a second matrix;

determining whether the mergeable instruction is to be merged with the first sorted instruction based on the first and second states; and after determining that the mergeable instruction is to be merged with the first sorted instruction, merging the first sorted instruction with the mergeable instruction.

9. The method of claim 8, wherein at least the first matrix aggregates information about transformations for the graphics processing component.

10. The method of claim 8, wherein each instruction of the sorted plurality of instructions is associated with a canvas, wherein the first sorted instruction is associated with a first portion of the canvas, and wherein determining whether the mergeable instruction is to be merged with the first sorted instruction based on the first and second states comprises:
searching one or more instructions in the instruction buffer for overlap in the canvas with the first portion, wherein the one or more instructions in the instruction buffer comprise the mergeable instruction; and
determining whether the one or more instructions in the instruction buffer do not overlap the first portion of the canvas and whether the first state does not differ from the second state.

11. The method of claim 10, further comprising:
after determining the one or more instructions in the instruction buffer do not overlap the first portion of the canvas and that first state does not differ from the second state, merging the first sorted instruction with the mergeable instruction.

12. The method of claim 8, wherein the first sorted instruction is associated with a first visible object type, and wherein searching the instruction buffer to identify the mergeable instruction comprises:
forming a first merging key for the first sorted instruction, wherein the first merging key comprises the first visible object type for the first sorted instruction;
performing a hash lookup in a hash table associated with the instruction buffer utilizing the first merging key; and
in response to finding a match in the hash table for the first merging key, determining that the mergeable instruction is an instruction in the hash table associated with the first merging key.

13. The method of claim 12, wherein the first visible object type is one or more of: a point visible object type, a line visible object type, a shape visible object type, an image visible object type, and a text visible object type.

14. The method of claim 8, wherein merging the first sorted instruction and the mergeable instruction comprises:
generating a merged instruction by merging the first sorted instruction and the mergeable instruction; and
replacing the mergeable instruction in the instruction buffer with the merged instruction.

15. The method of claim 1, wherein the graphics processing component performs the one or more merged instructions using a rendering pipeline, and wherein the rendering pipeline comprises the one or more shaders.

16. The method of claim 1, wherein providing the one or more merged instructions to the graphics processing component comprises providing information about one or more shaders for use in the rendering pipeline to perform the one or more merged instructions.

17. The method of claim 1, wherein the plurality of shaders include one or more of a vertex shader, a geometry shader, and a fragment shader.

18. A computing device, comprising:
a graphics processing component;
a processor; and
non-transitory computer-readable memory having one or more executable instructions stored thereon that, when executed by the processor, cause the computing device to perform functions comprising:
receiving a plurality of instructions for the graphics processing component, wherein the graphics processing component is associated with a plurality of shaders, wherein the plurality of instructions comprise a first instruction associated with a first group of shaders selected from the plurality of shaders and a second instruction associated with a second group of shaders selected from the plurality of shaders, and wherein each instruction of the plurality of instructions are associated with at least a portion of a canvas;
determining a sorted plurality of instructions by at least sorting the plurality of instructions so that the first instruction is sorted into a first group of instructions associated with the first group of shaders and the second instruction is sorted into a second group of instructions associated with the second group of shaders, wherein the first group of shaders differ from the second group of shaders, wherein the sorted plurality of instructions are sorted for similarity while preserving a drawing ordering of the plurality of instructions, and wherein sorting the plurality of instructions comprises:
determining a first portion of the canvas associated with the first instruction,
determining an insertion position in an instruction buffer for the first instruction by at least:
determining a second instruction in the instruction buffer,
determining a second portion of the canvas associated with the second instruction in the instruction buffer, and
if the second portion overlaps the first portion, then determining the insertion position based on an overlapping-instruction position, wherein the overlapping-instruction position is based on a position in the instruction buffer of the second instruction in the instruction buffer;
determining one or more merged instructions by at least merging the sorted plurality of instructions; and
providing the one or more merged instructions to the graphics processing component, wherein the graphics processing component performs the one or more merged instructions.

19. The computing device of claim 18, wherein sorting the plurality of instructions comprises:
determining whether the first instruction is similar to the second instruction by at least determining that the first group of the one or more shaders is the same as the second group of shaders;
after determining that the first instruction is similar to the second instruction, determining an insertion position in an instruction buffer based on a second position, wherein the second position is based on the position in the instruction buffer of the second instruction in the instruction buffer.

20. The computing device of claim 18, wherein the sorted plurality of instructions are stored in an instruction buffer, and wherein merging the sorted plurality of instructions comprises:
determining a first state of the graphics processing component, wherein the first state is represented by a first matrix;
associating the first state with a first sorted instruction of the sorted plurality of instructions;
searching an instruction buffer to identify a mergeable instruction for the first sorted instruction, wherein the mergeable instruction is stored at a mergeable location in the instruction buffer, and wherein the mergeable instruction is associated with a second state of the graphics processing component, and wherein the second state is represented by a second matrix;

determining whether the mergeable instruction is to be merged with the first sorted instruction based on the first and second states; and after determining that the mergeable instruction is to be merged with the first sorted instruction, merging the first sorted instruction with the mergeable instruction.

21. An article of manufacture including a non-transitory computer-readable memory having one or more executable instructions stored thereon that, when executed by a processor of a computing device, cause the computing device to perform functions comprising:

receiving a plurality of instructions for a graphics processing component of the computing device, wherein the graphics processing component is associated with a plurality of shaders, wherein the plurality of instructions comprise a first instruction associated with a first group of shaders selected from the plurality of shaders and a second instruction associated with a second group of shaders selected from the plurality of shaders, and wherein each instruction of the plurality of instructions are associated with at least a portion of a canvas;

determining a sorted plurality of instructions by at least sorting the plurality of instructions so that the first instruction is sorted into a first group of instructions associated with the first group of shaders and the second instruction is sorted into a second group of instructions associated with the second group of shaders, wherein the first group of shaders differ from the second group of shaders, wherein the sorted plurality of instructions are sorted for similarity while preserving a drawing ordering of the plurality of instructions, and wherein sorting the plurality of instructions comprises:

determining a first portion of the canvas associated with the first instruction, determining an insertion position in an instruction buffer for the first instruction by at least:

determining a second instruction in the instruction buffer, determining a second portion of the canvas associated with the second instruction in the instruction buffer, and if the second portion overlaps the first portion, then determining the insertion position based on an overlapping-instruction position, wherein the overlapping-instruction position is based on a position in the instruction buffer of the second instruction in the instruction buffer;

determining one or more merged instructions by at least merging the sorted plurality of instructions; and providing the one or more merged instructions to the graphics processing component, wherein the graphics processing component performs the one or more merged instructions.

* * * * *